(12) United States Patent
Itani

(10) Patent No.: US 8,200,062 B2
(45) Date of Patent: Jun. 12, 2012

(54) PLAYBACK APPARATUS, PROGRAM, AND PLAYBACK METHOD

(75) Inventor: Tetsuya Itani, Nara (JP)

(73) Assignee: Panasonic Corporation, Osaka (JP)

( * ) Notice: Subject to any disclaimer, the term of this patent is extended or adjusted under 35 U.S.C. 154(b) by 1451 days.

(21) Appl. No.: 11/735,307

(22) Filed: Apr. 13, 2007

(65) Prior Publication Data

US 2007/0248324 A1     Oct. 25, 2007

(30) Foreign Application Priority Data

Apr. 21, 2006  (JP) ................................. 2006-118233

(51) Int. Cl.
*H04N 5/765* (2006.01)
*H04N 5/93* (2006.01)

(52) U.S. Cl. ........................................ 386/200; 386/288

(58) Field of Classification Search .................. None
See application file for complete search history.

(56) References Cited

U.S. PATENT DOCUMENTS

| | | | | |
|---|---|---|---|---|
| 7,466,899 B2 * | 12/2008 | Kishi | ............................ | 386/343 |
| 7,787,743 B2 * | 8/2010 | Takakuwa et al. | ............ | 386/243 |
| 2004/0136686 A1 * | 7/2004 | Kono et al. | ..................... | 386/46 |
| 2006/0072910 A1 | 4/2006 | Kato | | |
| 2006/0171665 A1 | 8/2006 | Itani | | |
| 2006/0221001 A1 * | 10/2006 | Matono et al. | ................ | 345/75.2 |
| 2007/0237514 A1 * | 10/2007 | Pillman et al. | ................ | 396/153 |

FOREIGN PATENT DOCUMENTS

| | | |
|---|---|---|
| CN | 1805533 | 1/2006 |
| EP | 1 681 877 | 7/2006 |
| JP | 2001-223983 | 8/2001 |
| JP | 2004-221999 | 8/2004 |
| JP | 2006-109113 | 4/2006 |

* cited by examiner

*Primary Examiner* — Thai Tran
*Assistant Examiner* — Oluwaseun A Adegeye

(57) ABSTRACT

A playback apparatus including: a Clip information read circuit 5 that reads supplementary information from a recording medium 1, which also includes a video signal, and judges based on the supplementary information whether the video signal is of a first frame frequency or of a second frame frequency; a mode setting unit 13 that sets either a continuation or non-continuation mode, the continuation mode prohibiting and the non-continuation mode allowing a switch between frame frequencies during a playback; and a 24 Hz-60 Hz conversion circuit 7 and a digital modulation circuit 9 that, if the continuation mode is set, output the obtained video signal if it is of the first frame frequency, and generate a video signal of the first frame frequency by converting the obtained video signal and output the generated video signal if the obtained video signal is of the second frame frequency.

12 Claims, 22 Drawing Sheets

FIG. 22

Multi-frame monitor and quality priority mode 21-1: 24Hz progressive video signal

| n | n+1 | n+2 | n+3 |

21-2: Output from 24Hz-72Hz conversion circuit

| n | n | n | n+1 | n+1 | n+1 | n+2 | n+2 | n+2 | n+3 | n+3 | n+3 |

21-3:

| Quality priority mode | Switch selection | Output frame frequency |
|---|---|---|
| 24Hz progressive video signal, interless video signal | 60 fields/sec and 72 frames/sec<br>c: 24Hz-72Hz conversion circuit<br>a: Video demodulation circuit | 72 frames/sec,<br>60 fields/sec |

PLAYBACK APPARATUS, PROGRAM, AND PLAYBACK METHOD

BACKGROUND OF THE INVENTION (1) Field of the Invention

The present invention relates to a technical field of video output technology.

(2) Description of the Related Art

The video output technology is a technology for playing back video information that has been recorded on a recording medium or transferred over a transmission path, and outputting a video signal by a method that corresponds to a mode in which the playback apparatus is set.

In conventional technologies, typically a video signal of 60 frames/sec is used so that the television receivers can play back the received video signal. In recent years, however, monitors and projectors supporting the frame frequency of 24 frames/sec have been put into markets.

Such products have started to be put into markets because the video signal of 24 frames/sec is expected to be used more increasingly for the main movie provided in BD-ROM for sale, the BD-ROM being a next-generation optical disc. This is because images of a higher quality can be obtained when the video signal of 24 frames/sec is used for the main movie since the video signal is generated from a source that is a film on which the vide image is recorded at 24 frames/sec. Further, this will meet the demand of the market for higher-quality images.

The prior art concerning the video output technology includes Patent Document 1 (Japanese Patent Application Publication No. 2001-223983 (FIG. 1)) and Non-Patent Document 1 ("AV Review", No. 87, Ongen Publishing Co., Ltd., 1999).

Meanwhile, a connection method conforming to the HDMI (High Definition Multimedia Interface) standard is often used in the connection between a BD-ROM player and a monitor. In the HDMI connection, the connected apparatuses synchronize with each other when transferring data therebetween. As a result, when the frame frequency is switched from one to another, the apparatuses need to re-synchronize with each other. The re-synchronization process may take several seconds, and the video output is stopped during the re-synchronization. Also, when a connection method other than the HDMI connection is used, namely, a connection method that does not require the re-synchronization process is used, the display on the monitor may be disordered or interrupted if the frame frequency of the video signal changes rapidly.

Here, generally, in package software provided in the BD-ROM, the main movie is recorded as a video signal of 24 frames/sec, and most of the sources of video images other than the main movie, such as a menu or a bonus movie like the making of the main movie, are not recorded on films, and are recorded as video signals of 60 frames/sec. For this reason, if a playback path from the menu to the main movie, which differ from each other in the frame frequency, is selected during a playback of the package software, the video output may be stopped for several seconds due to the re-synchronization process according to the HDMI standard.

Even if a high-quality image is achieved by providing the video output at 24 frames/sec, a sudden stop of video output for several seconds will be felt by the user as a problem that may cause the user to complain about the product.

SUMMARY OF THE INVENTION

The object of the present invention is therefore to provide a playback apparatus, a program, and a playback method that prevent the user from complaining about the product, while maintaining the video output at 24 frames/sec.

The above object is fulfilled by a playback apparatus for obtaining a video signal from video information read out from a recording medium and outputting the obtained video signal to a display apparatus, supplementary information being recorded on the recording medium in correspondence with the video information to indicate whether a frame frequency of the video signal is a first frame frequency or a second frame frequency, the playback apparatus comprising: a video signal judging unit operable to read the supplementary information from the recording medium and judge whether the video signal is of the first frame frequency or of the second frame frequency; a mode setting unit operable to set either a continuation mode or a non-continuation mode as selected by a user, the continuation mode prohibiting and the non-continuation mode allowing a switch between frame frequencies during a playback; and a playback unit operable to, if the mode setting unit sets the continuation mode, output the obtained video signal if the video signal judging unit judges that the obtained video signal is of the first frame frequency, and generate a video signal of the first frame frequency by converting the obtained video signal and output the generated video signal if the video signal judging unit judges that the obtained video signal is of the second frame frequency.

With the above-described structure, when the user sets the operation mode to the continuation mode in preference of a display without interruption, a video signal of 24 Hz is converted into a video signal of 60 Hz and the video signal is output at 60 Hz, so that no change between frame frequencies occurs and the display is not interrupted during the playback. On the other hand, when the user sets the operation mode to the non-continuation mode on his/her own will, the video signal is output at 24 Hz for high quality. Accordingly, if the display on the display apparatus is interrupted during the playback, it would rarely develop into a claim against the product.

Further, the playback apparatus provides to the user an option to select the non-continuation mode in which the video signal is output at the frame frequency of 24 Hz, only if the connection partner display apparatus has a capability to display both a video signal of 60 Hz and a video signal of 24 Hz. As a result, the above-described structure prevents such a misoperation that the user is allowed to select the non-continuation mode in which the video signal is output at the frame frequency of 24 Hz although the connection partner display apparatus has a capability to display only the video signal of 60 Hz.

With such an arrangement, the user can enjoy the high-quality images realized by the video signal of the frame frequency of 24 Hz.

Here, in the case of playing back the above-mentioned package, it is preferable that the mode setting unit receives a selection by the user of the non-continuation mode or the continuation mode via a graphical user interface, and that the graphical user interface provides to the user a warning that a display on the display apparatus may be interrupted if a mixed-type video signal is continuously output in the non-continuation mode.

With the above-described structure, the user can select the non-continuation mode knowing the possibility that a display on the display apparatus may be interrupted. Accordingly, if the display on the display apparatus is interrupted during the playback, it would rarely develop in to a claim against the product. With this structure, when the playback apparatus is placed in an environment where it can play back a video signal at 24 frames/sec, the playback apparatus and display apparatus can fully show their abilities.

Here, it is preferable that the GUI generating unit generates the graphical user interface to initially display a first image status for receiving a selection by the user of the continuation mode, among two image statuses consisting of the first image status and a second image status for receiving a selection by the user of the non-continuation mode, wherein the two image statuses can be switched with each other by an operation of the user.

With the above-described structure in which the graphical user interface is initially in the first image status for receiving a selection by the user of the continuation mode, the user is required to operate actively to switch the image status to select the non-continuation mode. This can make the user recognize the demerit of interrupted display in a more reliable manner. Further, even if the user confirms a selected mode in quick response to the displayed screen without changing the image status, the operation mode is set to the continuation mode. In this case, no interruption of the display occurs, and thus it would not develop into a claim against the product.

Furthermore, the Clip information defined in the BD-ROM standard can be used as the supplementary information so that the present invention can be implemented in the playback apparatus without changing the data structure that conforms to the BD-ROM standard.

The above object is also fulfilled by a computer-readable program for use in computer as a playback apparatus for obtaining a video signal from video information read out from a recording medium and outputting the obtained video signal to a display apparatus, supplementary information being recorded on the recording medium in correspondence with the video information to indicate whether a frame frequency of the video signal is a first frame frequency or a second frame frequency, the program causing the computer to perform the steps of: reading the supplementary information from the recording medium and judging whether the video signal is of the first frame frequency or of the second frame frequency; setting either a continuation mode or a non-continuation mode as selected by a user, the continuation mode prohibiting and the non-continuation mode allowing a switch between frame frequencies during a playback; and outputting the obtained video signal if the mode setting sets the continuation mode and if the video signal judging judges that the obtained video signal is of the first frame frequency, and generating a video signal of the first frame frequency by converting the obtained video signal and outputting the generated video signal if the mode setting sets the continuation mode and if the video signal judging judges that the obtained video signal is of the second frame frequency.

The above object is further fulfilled by a playback method for use in a playback apparatus for obtaining a video signal from video information read out from a recording medium and outputting the obtained video signal to a display apparatus, supplementary information being recorded on the recording medium in correspondence with the video information to indicate whether a frame frequency of the video signal is a first frame frequency or a second frame frequency, the playback method comprising the steps of: reading the supplementary information from the recording medium and judging whether the video signal is of the first frame frequency or of the second frame frequency; setting either a continuation mode or a non-continuation mode as selected by a user, the continuation mode prohibiting and the non-continuation mode allowing a switch between frame frequencies during a playback; and outputting the obtained video signal if the mode setting sets the continuation mode and if the video signal judging judges that the obtained video signal is of the first frame frequency, and generating a video signal of the first frame frequency by converting the obtained video signal and outputting the generated video signal if the mode setting sets the continuation mode and if the video signal judging judges that the obtained video signal is of the second frame frequency.

BRIEF DESCRIPTION OF THE DRAWINGS

These and the other objects, advantages and features of the invention will be come apparent from the following description thereof taken in conjunction with the accompanying drawings which illustrate a specific embodiment of the invention.

In the drawings:

FIG. 22 shows (a) the input and output of the 24 Hz-72 Hz conversion circuit 24 and (b) the switch control by the switch control circuit 15 in correspondence with each other, in the case where the connection partner monitor is a multi-frame monitor and the playback apparatus is in the quality priority mode.

DESCRIPTION OF THE PREFERRED EMBODIMENT

The following describes preferred embodiments of the present invention, with reference to the attached drawings.
<Embodiment 1>

Figure 1:
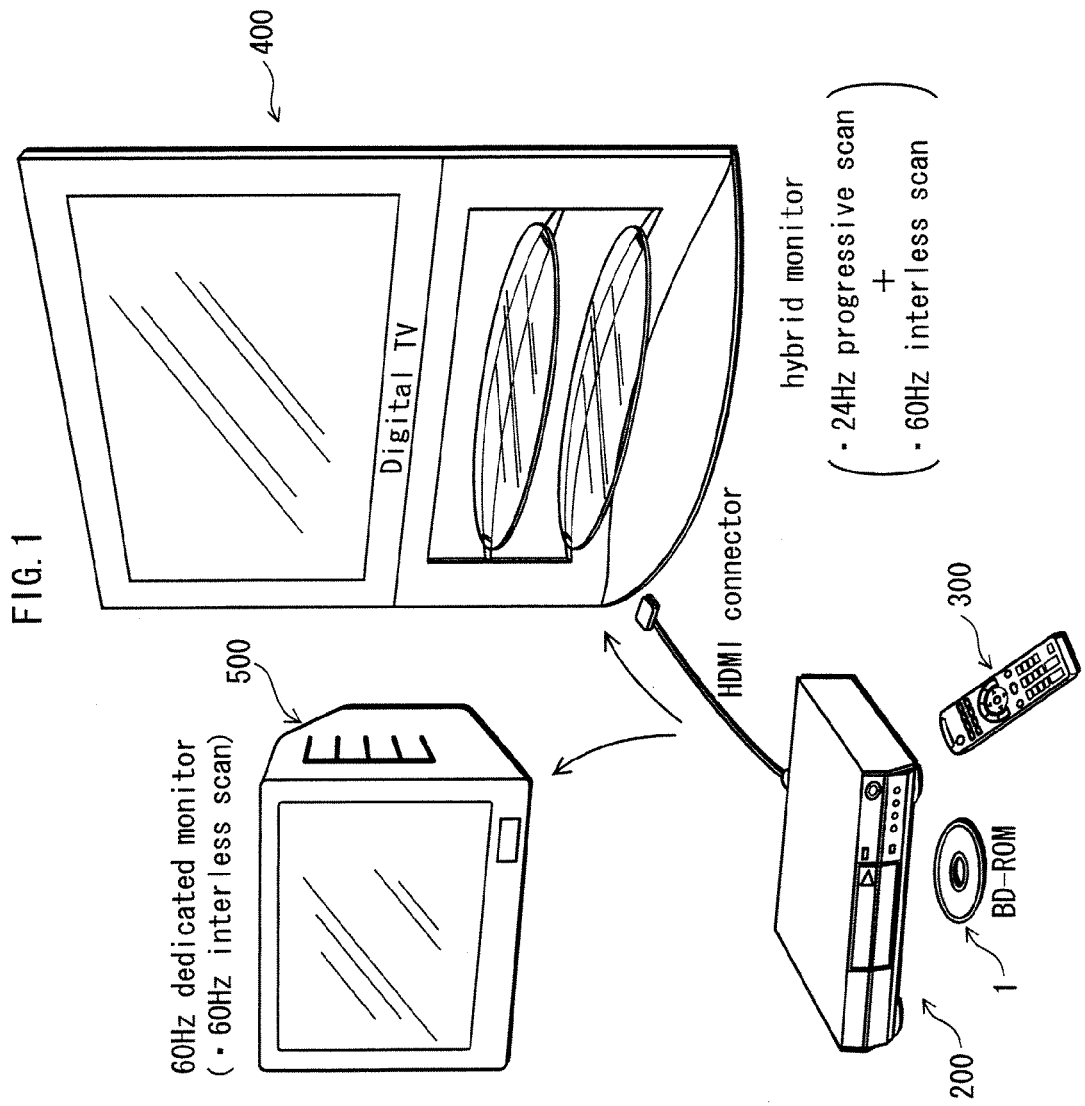
FIG. 1 shows a use form of the playback apparatus of the present invention.

First, among various aspects of the playback apparatus of the present invention, the use form will be described. In FIG. 1, the playback apparatus of the present invention is a playback apparatus 200 which is used in a home theater system that further includes a remote controller 300, a hybrid monitor 400, and 60 Hz dedicated monitor 500.

The playback apparatus 200 reproduces a video signal recorded on an optical disc 1. The playback apparatus outputs an interlace video signal of 60 frames/sec (hereinafter referred to as "60 Hz interlace signal") and a progressive video signal of 24 frames/sec, as video outputs. The playback apparatus has a digital output terminal, and sends these video signals to the hybrid monitor 400 and the 60 Hz dedicated monitor 500 via an HDMI connector.

The hybrid monitor 400 can display the 60 Hz interlace signal and the progressive video signal.

The 60 Hz dedicated monitor 500 can display the 60 Hz interlace signal.

Up to now, the use form of the playback apparatus of the present invention has been described.

Next, the manufacturing form of the playback apparatus of the present invention will be described. The playback apparatus of the present invention can be industrially manufactured based on the internal structure shown in FIG. 2.

Figure 2:
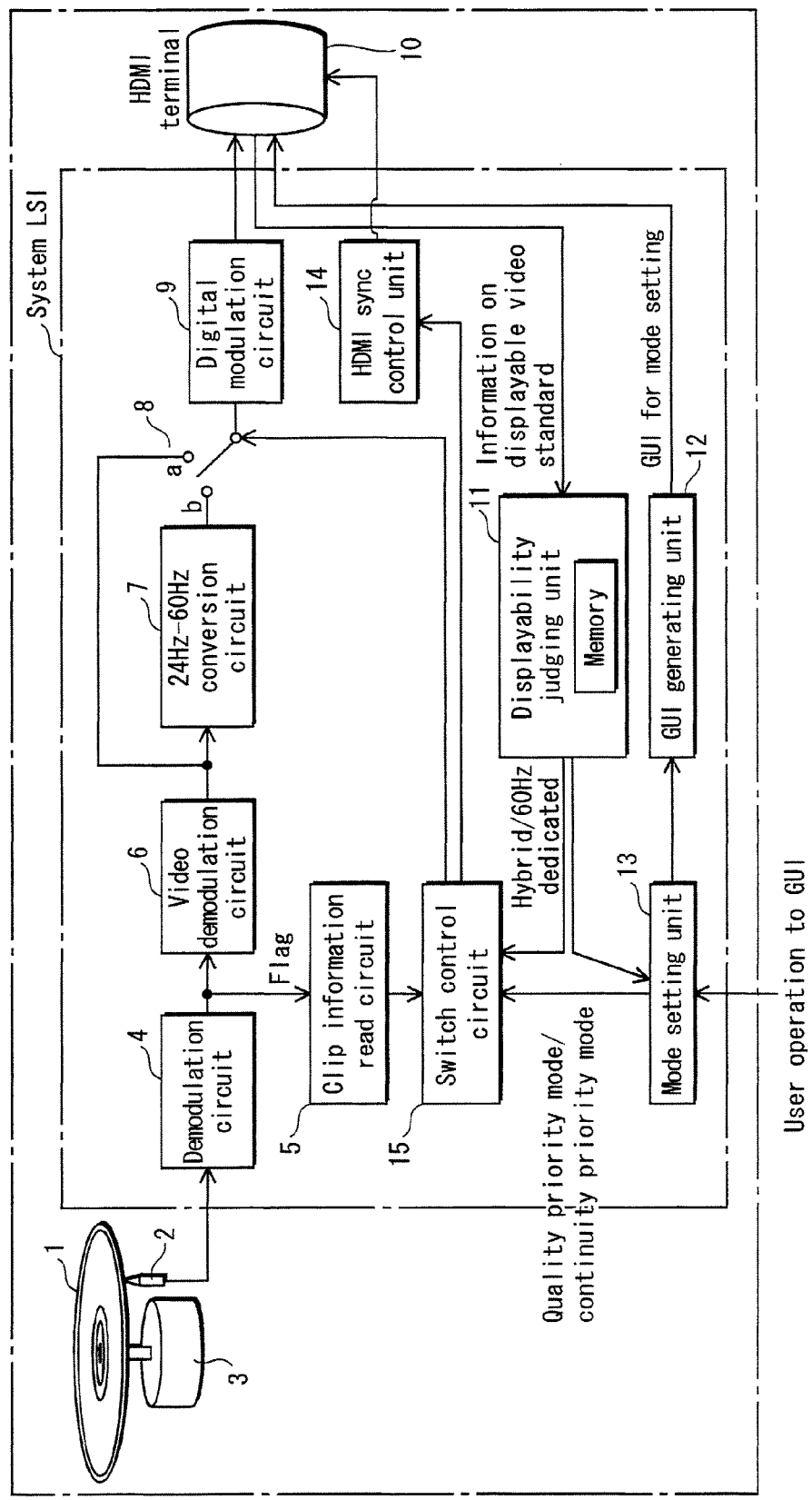
FIG. 2 is a block diagram showing the playback apparatus in Embodiment 1.

FIG. 2 is a block diagram showing the playback apparatus in Embodiment 1. In FIG. 2, the playback apparatus includes the optical disc 1, an optical pickup 2, a motor 3, a demodulation circuit 4, a Clip information read circuit 5, a video demodulation circuit 6, a 24 Hz-60 Hz conversion circuit 7, a switch 8, a digital modulation circuit 9, a terminal 10, an HDMI sync control unit 14, a display ability judging unit 11, a GUI generating unit 12, a mode setting unit 13, and a switch control circuit 15. Among these constitutional elements, the demodulation circuit 4 through the switch control circuit 15, except for the terminal 10, are integrated in one system LSI.
<Disc 1>

Figure 3:
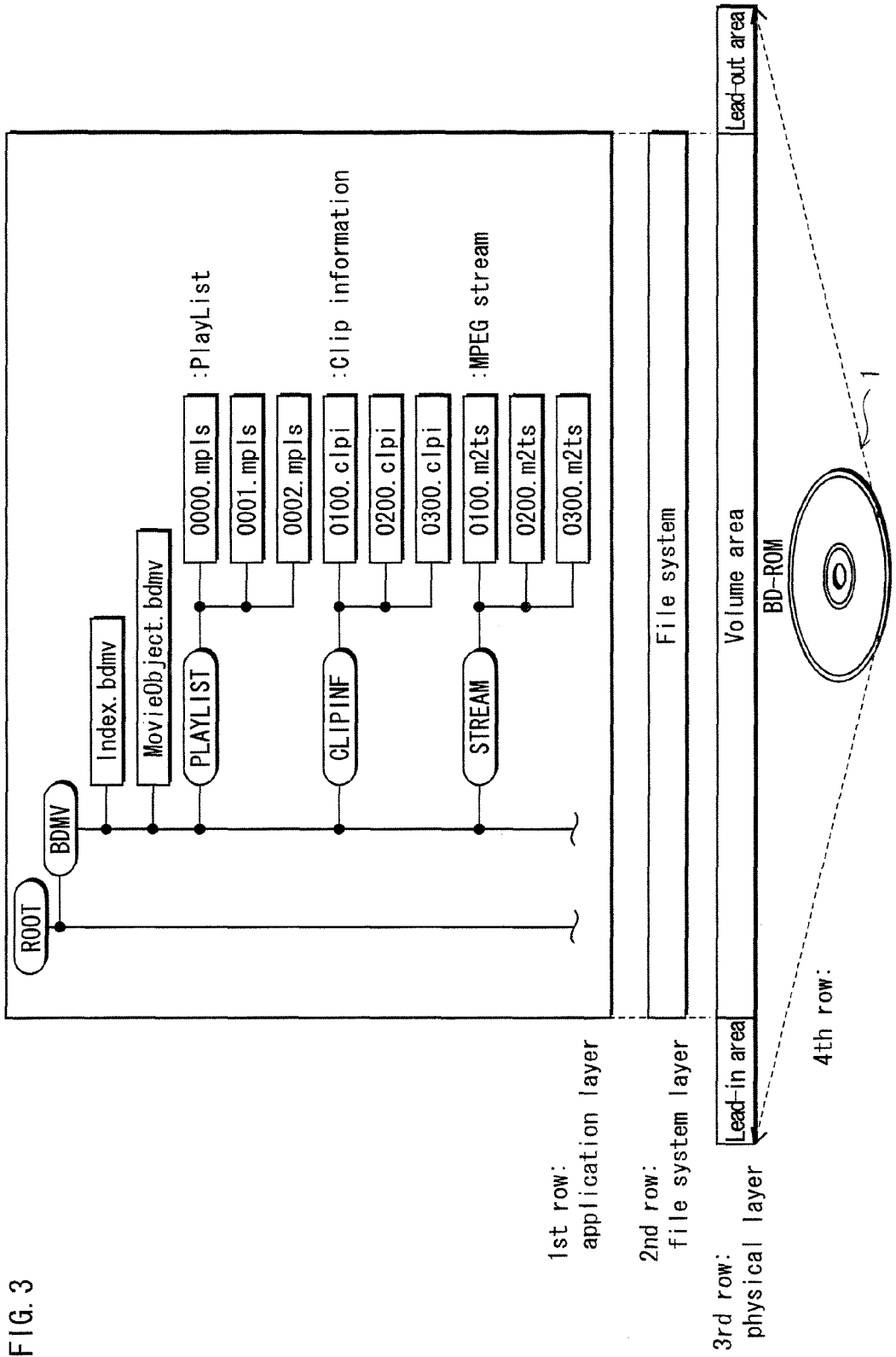
FIG. 3 shows the internal structure of the BD-ROM.

The disc 1 is a BD-ROM on which video signals compressed by MPEG2 (ITU-T recommendation H.262/ISO/IEC13818-2) are recorded. FIG. 3 shows the internal structure of the BD-ROM.

The fourth row of FIG. 3 shows the BD-ROM. The third row shows tracks on the BD-ROM. FIG. 3 shows the tracks in the state where they are horizontally extended though they are in reality formed spirally in order from the inner circumference to the outer circumference. The tracks include a lead-in area, a volume area, and a lead-out area. The volume area of FIG. 3 has a layer model that includes a physical layer, a file system layer, and an application layer. The 1$^{st}$ row of FIG. 3 shows an application layer format (application format) of the BD-ROM represented by a directory structure. In the 1$^{st}$ row of FIG. 3, the BD-ROM includes a BDMV directory under a root directory.

The BDMV directory includes files to which an extension "bdmv" is attached ("index.bdmv" and "Movie Object.bdmv"). Under the BDMV directory, there are three subdirectories: PLAYLIST directory, CLIPINF directory, and STREAM directory.

The STREAM directory stores files that are sort of main video signals, and includes files to which an extension "m2ts" is attached.

The PLAYLIST directory includes files to which an extension "mpls" is attached.

The CLIPINF directory includes files to which an extension "clpi" is attached.

The following will describe these files.
<AVClip>

Figure 4:
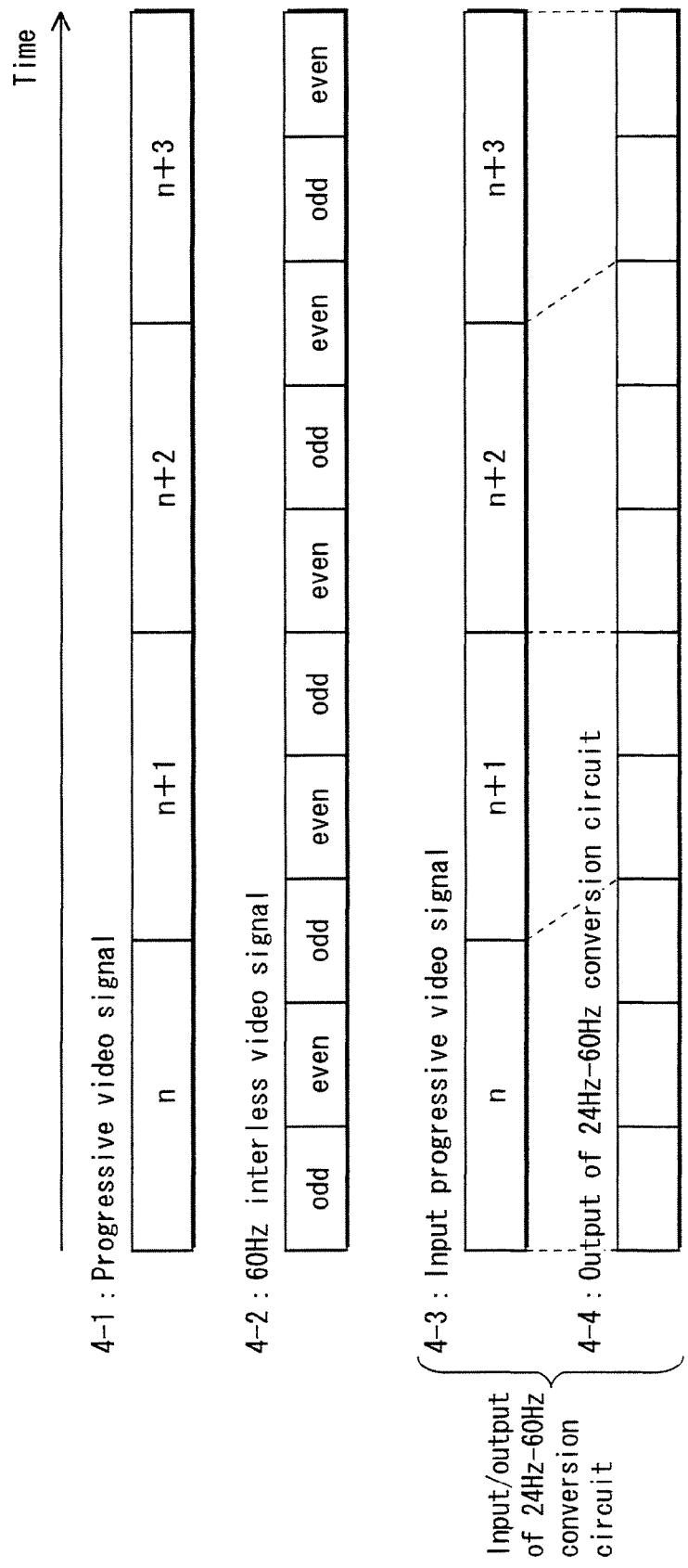
FIG. 4 shows the two types of video signals recorded on the optical disc 1.

Firstly, files with the extension "m2ts" will be explained. The files the extension "m2ts" store AVClips that are generated by encoding video signals. Two types of video signals are recorded on the optical disc 1. FIG. 4 shows the two types of video signals recorded on the optical disc 1.

The progressive video signals are video signals whose sources are video signals recorded on films. The progressive video signals are composed of frames n, n+1, n+2, n+3 for 24 frames per second, as shown in the row 4-1 of FIG. 4.

The 60 Hz interlace video signals are video signals whose sources are mainly signals recorded by video cameras. The 60 Hz interlace video signals are composed of fields "odd", "even", "odd", "even", "odd", "even", "odd", which respectively appear at 30 frames per second and 60 frames per second, as shown in the row 4-2 of FIG. 4.

In the actual movie, cut scenes, interview images, making images or the like are recorded, as well as the main movie. In most cases, these images are of different types, such as the progressive video signals and the 60 Hz interlace video signals. As a result, in a playback of the optical disc 1, the progressive video signals and the 60 Hz interlace video signals may be read out in a mixed state.
<Clip Information>

Figure 5:
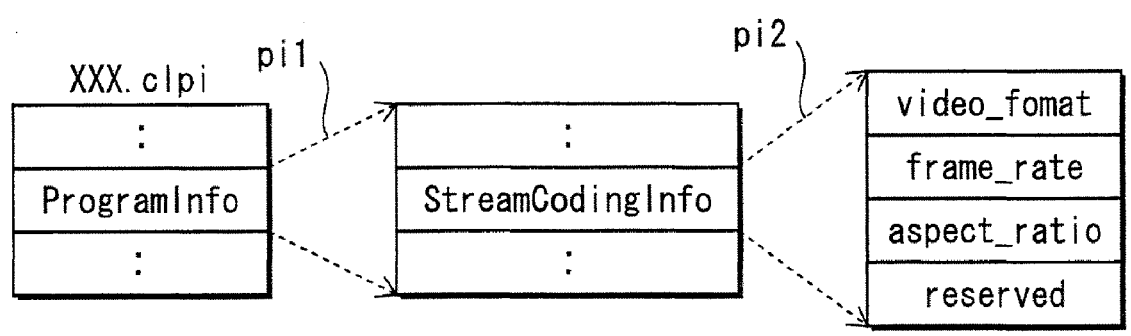
FIG. 5 shows the structure of Clip information.

Files with the extension "clpi" store Clip information that corresponds one-to-one to AVClips. FIG. 5 shows the structure of Clip information. Since it is the management information, the Clip information includes information concerning the AVClip, such as the resolution, scan method, frame rate, and aspect ratio. As shown on the left-hand side of FIG. 5, the Clip information includes "ProgramInfo". As indicated by the broken line arrow pi1, the ProgramInfo includes "StreamCodingInfo". The broken line pi2 indicates the close-up of the internal structure of the StreamCodingInfo. As shown in FIG. 5, the StreamCodingInfo includes "video_format", "frame_rate", and "aspect_ratio", where the "video_format" indicates the resolution or scan method of the video signal contained in the corresponding AVClip, the "frame_rate" indicates the frame rate of the video signal, and the "aspect_ratio" indicates the aspect ratio.

With this structure, the playback apparatus can recognize the type of the corresponding video signal by reading the Clip information from the optical disc 1 and referring to the frame_rate, prior to the playback of the video signal.
<PlayList Information>

Figure 6:
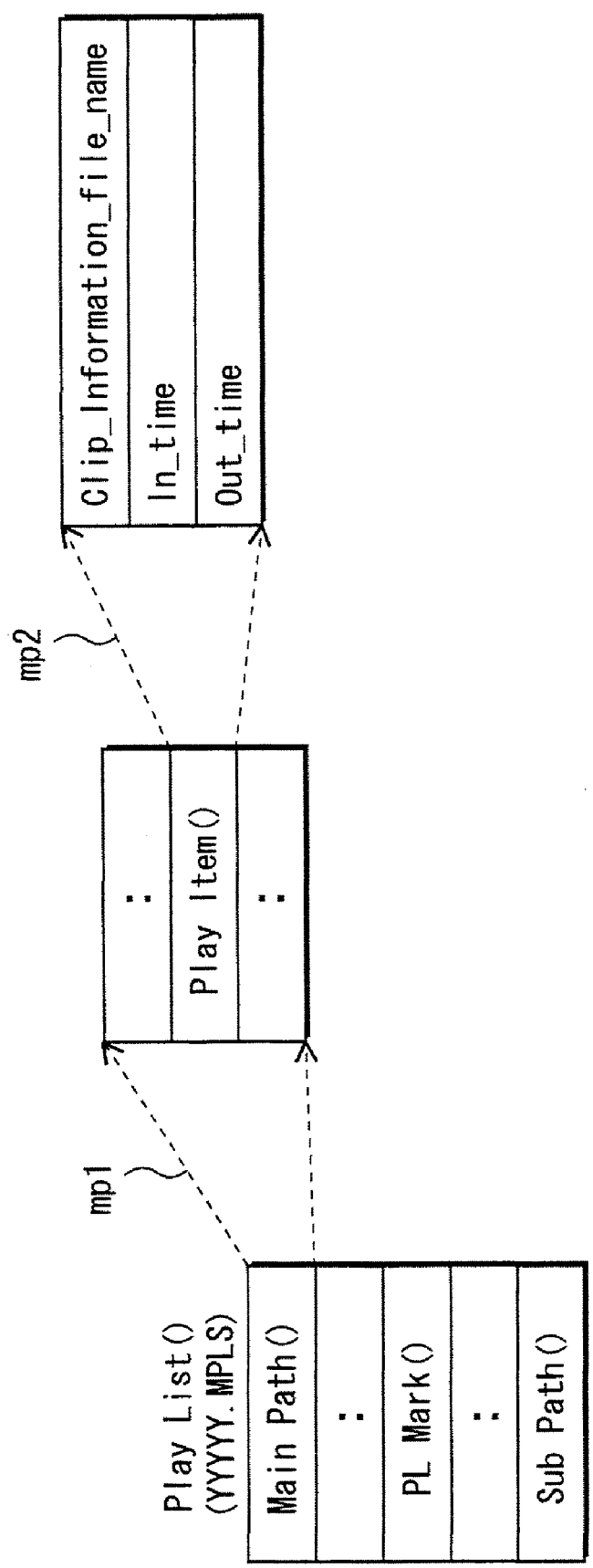
FIG. 6 shows the structure of PL information.

Files with the extension "mpls" store PlayList (PL) information that defines a PlayList by referring to the AVClip. FIG. 6 shows the structure of PL information. As shown on the left-hand side of the drawing, the PL information includes "MainPath information", "PLMark information", and "Subpath information".

As indicated by the broken line arrow mp1, the MainPath information (MainPath( )) includes a plurality of pieces of PlayItem information (PlayItem ( )). The PlayItem is a playback period that is defined by specifying In_Time and Out_Time on the AVClip time axis. A PlayList (PL) composed of a plurality of playback periods is defined by arranging a plurality of pieces of PlayItem information. The broken line mp2 indicates the close-up of the internal structure of the PlayItem Information. As shown in FIG. 6, the PlayItem Information includes "Clip_information_file_name". "In_time", and "Out_time", where the Clip_information_file_name indicates the corresponding AVClip.

The PlayList Information can define a plurality of pieces of PlayItem Information. However, it is defined in the BD-ROM standard that AVClips specified by the PlayItem Information should be under constant encoding conditions throughout the entire PlayList. As a result, when a PlayList is played back, the video signals obtained with the playback have the same frame frequency regardless of the AVClips to which the obtained video signals belong.

<Movie Object>

Figure 7:
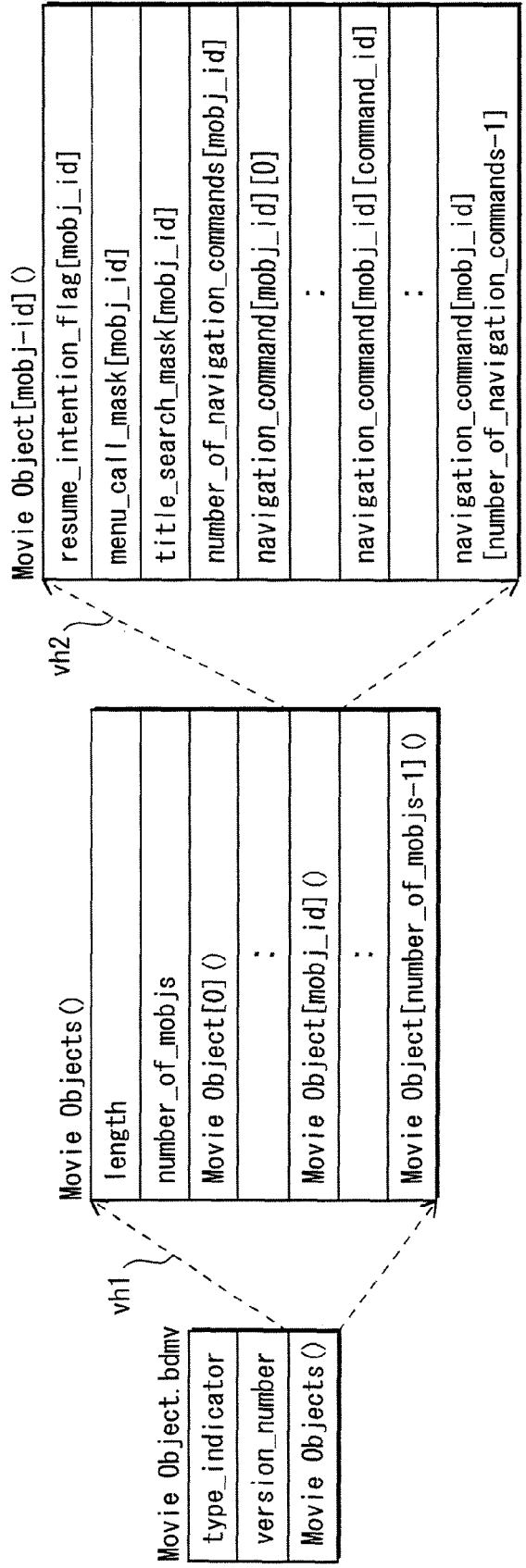
FIG. 7 shows the structure of the Movie Object.bdmv.

The Movie Object.bdmv stores Movie Objects. FIG. 7 shows the structure of the MovieObject.bdmv. As shown on the left-hand side of the drawing, the Movie Object.bdmv includes "type_indicater" indicating code sequence "MOBJ", "version_number", and "Movie Objects( )" being one or more Movie Objects. The lead line vh1 indicates the close-up of the Movie Objects. The Movie Objects( ) includes "length" indicating the data length thereof, "number_of_mobjs" indicating the number of Movie Objects contained therein, and as many "Movie Objects" as indicated by "number_of_mobjs". Each of the Movie Objects is identified by an identifier "mobj_id". The lead line vh2 indicates the close-up of a given Movie Object[mobj_id]( ) identified by an identifier "mobj_id".

As the drawing shows, the Movie Object includes "resume_intention_flag" indicating whether or not there is an intention to resume a playback after a MenuCall, "menu_call_mask" indicating whether or not to mask the MenuCall, "title_search flag" indicating whether or not to mask the title search function, "number_of_navigation_command" indicating the number of navigation commands, and as many navigation commands as indicated by the "number_of_navigation_command".

The navigation command sequence is composed of a command sequence for achieving a conditional branch, setting a status register of the playback apparatus, acquiring a value set in the status register, and such. The following shows the commands that can be written in Movie Objects.

PlayPL Command

Format: PlayPL(1$^{st}$ Argument, 2$^{nd}$ Argument)

As the 1$^{st}$ argument, a PlayList number is written to specify a PlayList to be played back. As the 2$^{nd}$ argument, a PlayItem included in the PlayList, given time in the PlayList, Chapter, or Mark to specify a playback start position.

A PlayPL function using the PlayItem to specify a playback start position in the PL time axis is referred to as "PlayPLatPlayItem( )".

A PlayPL function using the Chapter to specify a playback start position in the PL time axis is referred to as "PlayPLatChapter( )".

A PlayPL function using the time information to specify a playback start position in the PL time axis is referred to as "PlayPLatSpecifiedTime( )".

JMP Command

Format: JMP Argument

The JMP command is used for a branch that discards a currently executed dynamic scenario and executes a branch destination dynamic scenario that is specified by the argument. The JMP command has two types: a direct reference type that directly specifies the branch destination dynamic scenario; and an indirect reference type that indirectly refers to the branch destination dynamic scenario.

The description format of the navigation command in the Movie Object resembles that in DVD. For this reason, a transplant of a disc content from a DVD onto a BD-ROM can be done efficiently. The Movie Object is a prior art disclosed in the following International Publication. For details, refer to the International Publication.

International Publication WO 2004/074976.

<Index.bdmv>

The Index.bdmv is a file that is read out first after the BD-ROM disc is inserted into the playback apparatus. The Index.bdmv includes a table that shows a plurality of playable titles contained in the BD-ROM disc and Objects, in one-to-one correspondence with each other, where "playable" means that the titles can be played back. Here, the types of the titles that can be recorded on the BD-ROM will be explained. The titles that can be recorded on the BD-ROM include "FirstPlayTitle", "TopMenuTitle", and "Title#1, #2, #3".

The "FirstPlayTitle" plays a role of playing back a dynamic trademark first of all when the BD-ROM is loaded. Accordingly, the FirstPlayTitle enables a dynamic trademark, which represents the producer or the distributor of a motion picture, to be played back every time the BD-ROM is loaded.

The "TopMenuTitle" is a Title that plays back a menu that is at the top of a hierarchy of menus in the BD-ROM.

The "Title#1, #2, #3" are Titles that correspond to general motion pictures. The correspondence among the Titles "FirstPlayTitle", "TopMenuTitle", and "Title#1, #2, #3" is indicated in "Index.bdmv".

Figure 8:
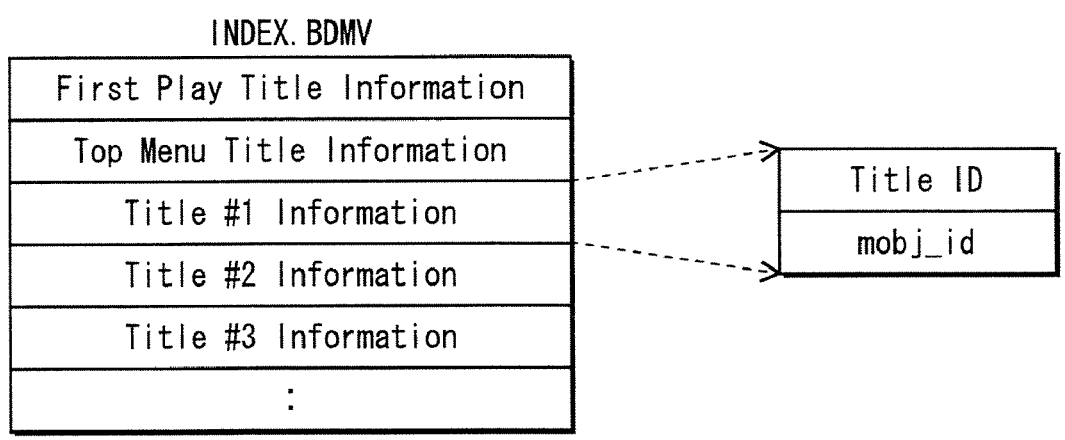
FIG. 8 shows the structure of the Index.bdmv.

FIG. 8 shows the structure of the Index.bdmv. As shown in FIG. 8, the Index.bdmv includes a plurality of pieces of Title information: "FirstPlayTitle information", "TopMenuTitle information", "Title#1 information", "Title#2 information", and "Title#3 information". Each piece of Title information indicates a Title identification number and a Movie Object that correspond to each other. With these pieces of Title information, it is possible to identify a Movie Object that defines a Title, and from the Movie Object, PlayList information to be played back can be detected. Up to now, the Index.bdmv has been described.

The following International Publication includes detailed description of Index.bdmv. For details, refer to the International Publication International Publication WO 2004/025651.

Up to now, the disc 1 has been described.

<Pickup 2, Motor 3, Demodulation Circuit 4>

The pickup 2 converts a signal recorded on the optical disc 1 into an electric signal.

The motor 3 causes the optical disc 1 at a speed appropriate for the playback.

The demodulation circuit 4 demodulates the electric signal output from the optical pickup 2 to obtain a bit sequence. The demodulation circuit 4 performs an error correction on the obtained bit sequence, and outputs a compressed video signal and supplementary information that is necessary for the playback. The supplementary information includes PlayList information, Clip information and the like.

<Clip Information Read Circuit 5>

The Clip information read circuit 5 reads the above-described Clip information from the output of the demodulation circuit 4, refers to the frame_rate in the Clip information, and judges whether the video signal read out from the optical disc 1 is the progressive video signal or 60 Hz interlace video signal. The result of this judgment is input into the switch control circuit 15.

The Clip information read circuit 5 performs the judgment prior to a playback of an AVClip, after a playback target PlayList has been changed by a command in a Movie Object or the like.

<Video Demodulation Circuit 6>

The video demodulation circuit 6 demodulates the compressed video signal output from the demodulation circuit 4 to obtain a digital video signal. The digital video signal output from the video demodulation circuit 6 after the demodulation is input to the contact "a" of the switch 8 and to the 24 Hz-60 Hz conversion circuit 7.

<24 Hz-60 Hz Conversion Circuit 7>

The 24 Hz-60 Hz conversion circuit 7 converts the progressive video signal recorded at 24 frames per second into a 60 Hz interlace video signal, and outputs the 60 Hz interlace video signal to the contact "b" of the switch 8. In FIG. 4, the rows 4-3 and 4-4 indicate the procedures of the 24 Hz-60 Hz conversion circuit 7. The 24 Hz-60 Hz conversion circuit 7 converts, among the frames of the progressive video signal, frames n and n+2 into three fields.

The 24 Hz-60 Hz conversion circuit 7 also converts frames n+1 and n+3 into two fields. As a result of this, the 60 Hz interlace video signal shown in the row 4-4 of FIG. 4 is obtained.

<Switch 8>

The switch 8 selectively outputs either the output from the video demodulation circuit 6 or the output from the 24 Hz-60 Hz conversion circuit 7 to the digital modulation circuit 9, by making a connection either to the contact "a" or to the contact "b".

<Digital Modulation Circuit 9>

The digital modulation circuit 9 performs a digital video signal modulation in compliance with the HDMI format, onto either of the 24 Hz progressive video signal and the 60 Hz interlace video signal output from the switch 8, and outputs the modulation result either to the hybrid monitor 400 or to the 60 Hz dedicated monitor 500. As a result of this, a video signal is displayed as video.

<Terminal 10>

The terminal 10 is a terminal conforming to the HDMI standard. The terminal 10 includes a transmission path for transmitting a digitally modulated video signal, and a serial transmission path for mutual communication defined in both VESA/E-DDC and EIA/CEA 861-B. The terminal 10 is connected to the hybrid monitor 400 and the 60 Hz dedicated monitor 500. Inside the monitor, a ROM is loaded. The ROM store information (EDID) on the displayable video standard of the monitor. Accordingly, the information on the displayable video standard can be read from the ROM via the serial transmission path.

<Displayability Judging Unit 11>

The displayability judging unit 11 extracts the "information on the displayable video standard of the monitor" from the ROM within the monitor, via the serial transmission path, and judges, based on the extracted information, whether the monitor being the connection partner is the hybrid monitor 400 or the 60 Hz dedicated monitor 500. The displayability judging unit 11 sends the judgment result to the switch control circuit 15 and the mode setting unit 13.

<GUI Generating Unit 12>

The GUI generating unit 12 generates a Graphical User Interface (GUI) written in the OSD (On Screen Display) or the BML (Broadcast Markup Language), and outputs the generated GUI to the hybrid monitor 400 to cause the hybrid monitor 400 to display the GUI.

<Mode Setting Unit 13>

Figure 9:
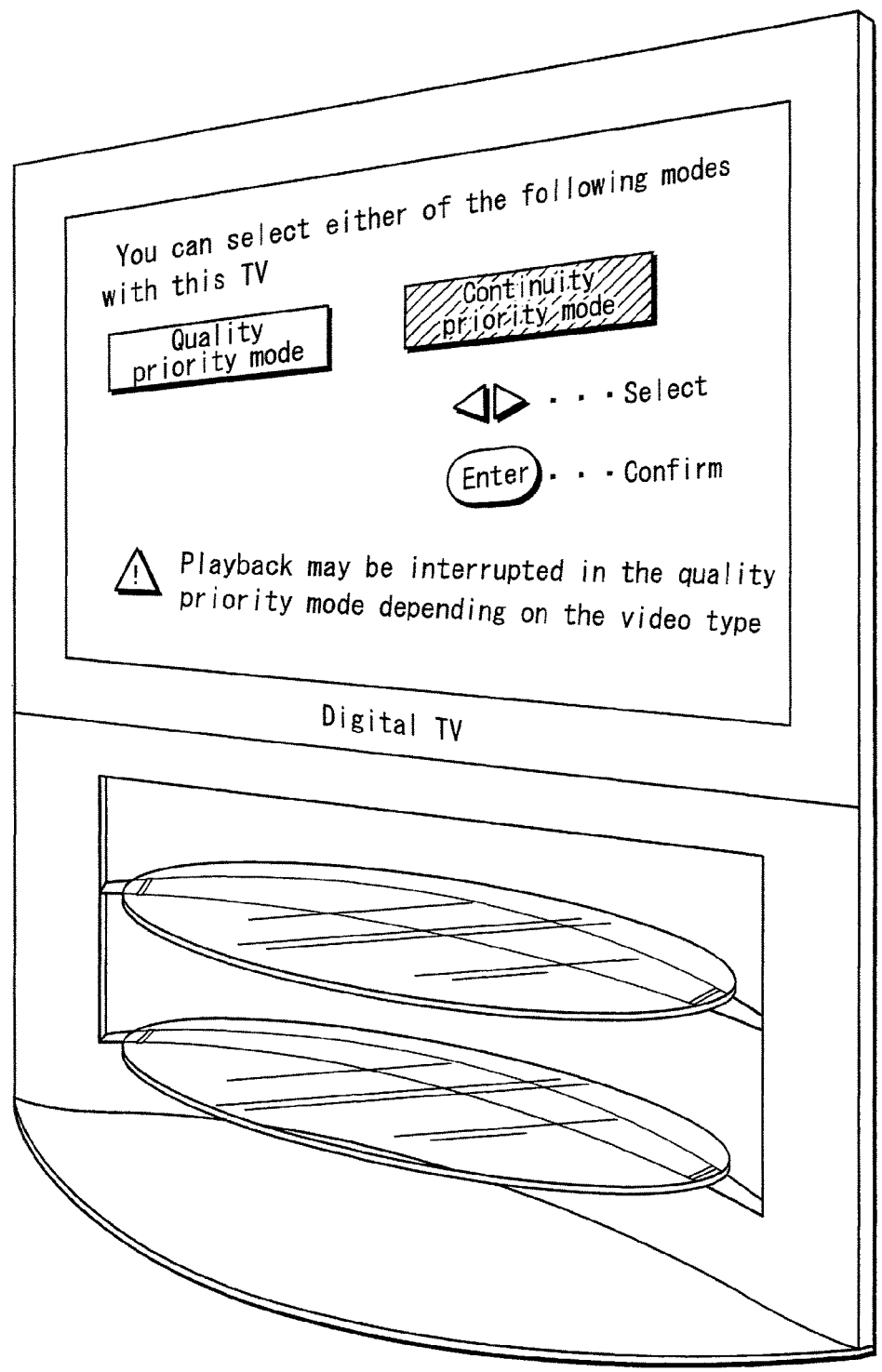
FIG. 9 shows a GUI generated by the GUI generating unit 12.

The mode setting unit 13 causes the GUI generating unit 12 to generate a GUI used for receiving a mode setting and to output the generated GUI to the hybrid monitor 400. FIG. 9 shows a GUI generated by the GUI generating unit 12. The buttons shown in FIG. 9 are provided for receiving settings for the image quality priority mode and the continuity priority mode, respectively. The button can indicate the normal state, focus state, and active state.

The "continuity priority mode" is a mode in which there is no change in the frame frequency during a playback.

The "quality priority mode" is a discontinuity mode in which there may be a change in the frame frequency during a playback.

Figure 10:
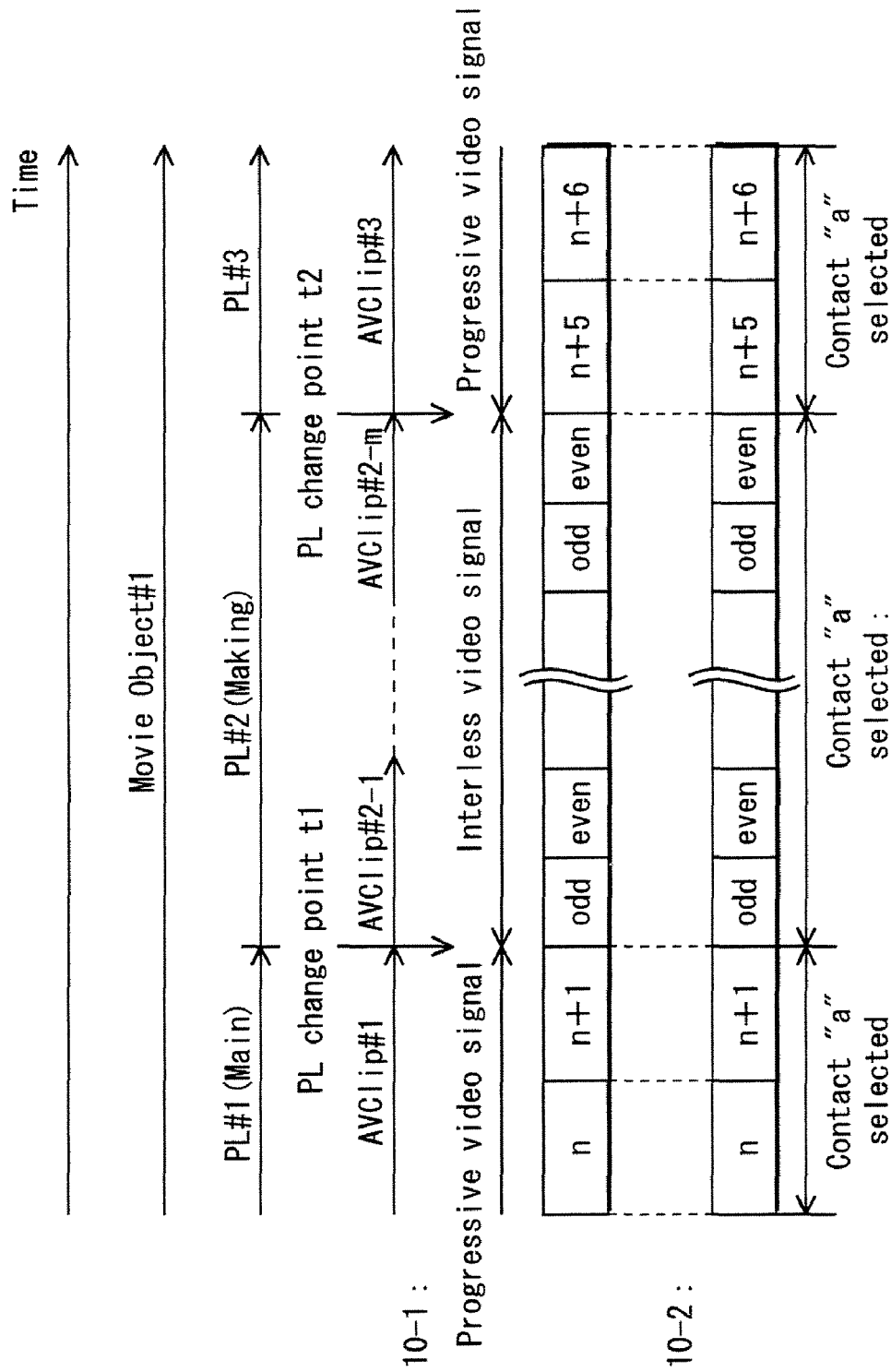
FIG. 10 shows operations at changes between the progressive video signal and the 60 Hz interlace video signal.

Here, the change in the frame frequency in the quality priority mode will be described. FIG. 10 shows operations at changes between the progressive video signal and the 60 Hz interlace video signal. In general, in the case where the video signal of the main movie recorded on the optical disc 1 has been made from a movie material is recorded on a film, a switch between the progressive video signal and the 60 Hz interlace video signal may happen when PlayLists change, as indicated in the row 10-1 of FIG. 10. Such a switch happens when a Movie Object, which is a combination of (a) a main movie composed of 24 frames/sec frames n, n+1, n+5, and n+6 and (b) a "making" of the movie composed of a 60 Hz interlace video signal, is played back. The row 10-2 of FIG. 10 indicates an output to the digital modulation circuit 9 during a playback of the Movie Object.

In Movie Object#1, a switch from PL#1 of the progressive video signal to PL#2 of the interlace video signal happens, and then it switches to PL#3 of the progressive video signal. In such changes from the progressive video signal to the interlace video signal, or from the interlace video signal to the progressive video signal, a re-synchronization with the monitor happens. When this happens, the video output inevitably stops during the re-synchronization.

Although such a change happens, when the main movie is played back at a display frequency of 24 Hz, the motion of the characters in the movie, which was originally recorded on a film, can be played back finely. The "quality priority" in the quality priority mode means that the motion can be played back finely by the display at the display frequency of 24 Hz.

In FIG. 9, the user can change a button that is in the focus state by pressing the leftward or rightward key of the remote controller. The mode setting unit 13, when the Enter key is pressed, sets the mode, which corresponds to the button in the focus state, to the current mode of the playback apparatus. The greatest characteristic of the GUI is that it indicates to the user a demerit of setting the playback apparatus to the quality priority mode. That is to say, the message "Playback may be interrupted in the quality priority mode depending on the video type" shown in FIG. 9 indicates a demerit of setting the playback apparatus to the quality priority mode. While the demerit of the quality priority mode is indicated, the button corresponding to the continuity priority mode is set to be in the focus state, as a default setting. With this arrangement, the user can set the playback apparatus to the quality priority mode, understanding that the playback may be interrupted in the quality priority mode if a mixture of the progressive video signal and the interlace video signal is played back. This will prevent the user from complaining about the product even if a playback disorder occurs due to a playback of a mixed signal.
<HDMI Sync Control Unit 14>

The HDMI sync control unit 14 is a functional block that controls the synchronization with the monitor in the video signal transmission pass conforming to the HDMI. The HDMI sync control unit 14 performs a re-synchronization with the monitor depending on the number of frames notified from the switch control circuit 15.
<Switch Control Circuit 15>

The switch control circuit 15 controls the switch 8 depending on a combination of (a) the frame frequency of AVClip recorded on the optical disc 1, (b) the type of the monitor to which the playback apparatus is connected, and (c) the mode setting in the playback apparatus. Also, in compliance with this control, the switch control circuit 15 notifies the frame frequency notified from the Clip information read circuit 5, to the HDMI sync control unit 14. The following describes details of the switch control performed by the switch control circuit 15.
<Details of Switch Control Circuit 15—1>
When Connected to Hybrid Monitor 400 in Quality Priority Mode FIG. 11 shows the output from the video demodulation circuit 6 and the switch control by the switch control circuit 15 in correspondence with each other, in the case where the playback apparatus is connected to the hybrid monitor 400 in the quality priority mode.

Figure 11:
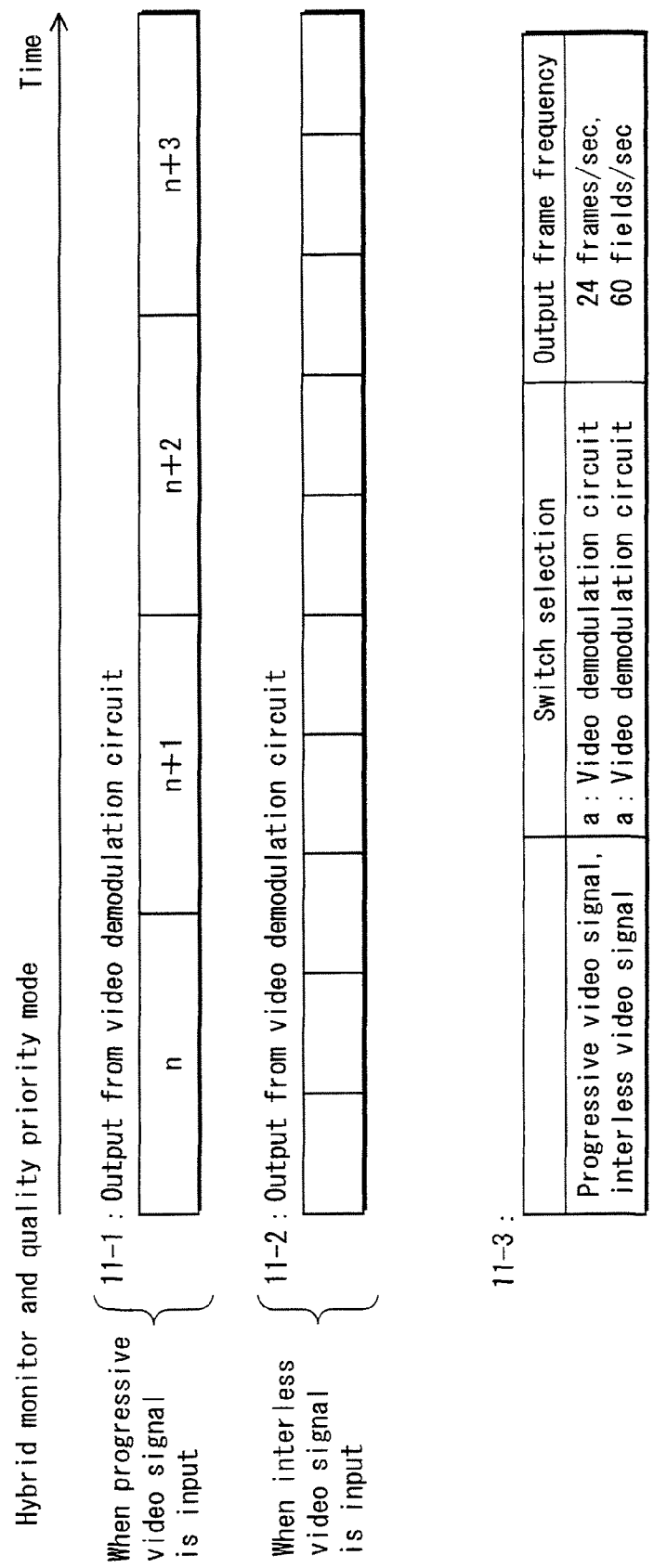
FIG. 11 shows the input/output of the video demodulation circuit 6 and the switch control by the switch control circuit 15 in correspondence with each other, in the case where the playback apparatus is connected to the hybrid monitor 400 in the quality priority mode.

The row 11-1 of FIG. 11 indicates the progressive video signal that is output to the contact "a" by the through output. The row 11-2 indicates the 60 Hz interlace video signal that is output to the contact "a" by the through output. It is understood from FIG. 11 that when the 60 Hz interlace video signal is input, the 60 Hz interlace video signal is output, and when the progressive video signal is input, the progressive video signal is output.

The row 11-3 indicates the switch control by the switch control circuit 15 in the case where the connection partner is the hybrid monitor 400 and the playback apparatus has been set to the quality priority mode.

Regardless of the input video signal, the switch control circuit 15 sets the switch 8 to the contact "a", and sends the output of the video demodulation circuit 6 to the digital modulation circuit 9 by the through output.

Figure 12:
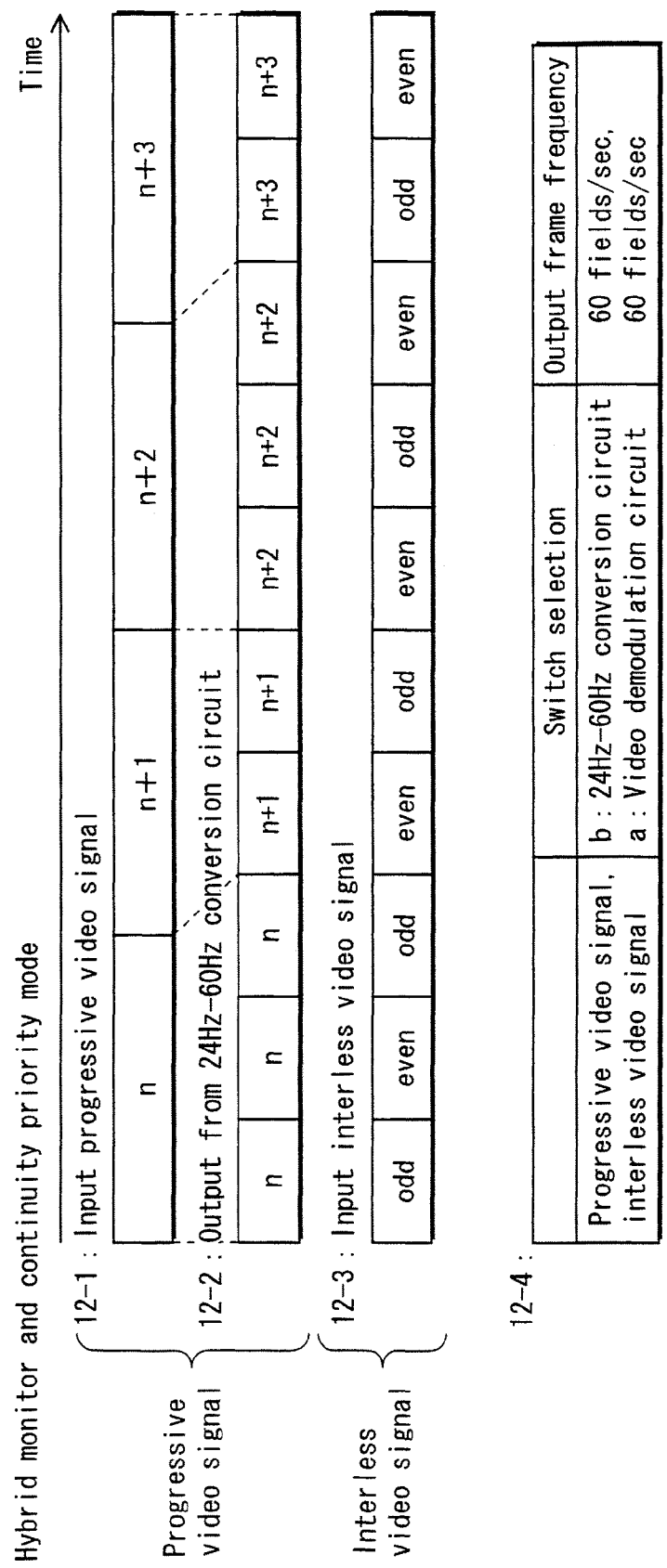
FIG. 12 shows (a) the input/output of the video demodulation circuit 6 and the 24 Hz-60 Hz conversion circuit 7 and (b) the switch control by the switch control circuit 15 in correspondence with each other, in the case where the playback apparatus is connected to the hybrid monitor 400 in the continuity priority mode.

Accordingly, when the playback apparatus is set to the quality priority mode and the progressive video signal is input, the 24 frames/sec video signal is output, and when the interlace video signal is input, the switch 8 is set to the contact "a" and the 60 Hz interlace video signal is output.
<Details of Switch Control Circuit 15—2>
Switch in Continuity Priority Mode FIG. 12 shows (a) the input/output of the video demodulation circuit 6 and the 24 Hz-60 Hz conversion circuit 7 and (b) the switch control by the switch control circuit 15 in correspondence with each other, in the case where the playback apparatus is connected to the hybrid monitor 400 in the continuity priority mode.

The rows 12-1 and 12-2 of FIG. 12 indicate the input/output of the 24 Hz-60 Hz conversion circuit 7 when the input signal is the progressive video signal. As shown in the drawing, the 24 Hz-60 Hz conversion circuit 7 converts each frame of the 24 frames/sec video signal, that is shown in the row 12-1, into three fields and two fields, alternately. As a result of this, the 60 Hz interlace video signal shown in the row 12-2 is obtained. The row 12-3 indicates the 60 Hz interlace video signal that is output to the contact "a" by the through output. The row 12-4 indicates the switch control by the switch control circuit 15 in the case where the input/output of the 24 Hz-60 Hz conversion circuit 7 is as indicated in the rows 12-1 and 12-2.

When the input video signal is judged to be a progressive video signal, the switch 8 is set to the contact "b", and the output of the 24 Hz-60 Hz conversion circuit 7 is output to the digital modulation circuit 9.

When the input video signal is a 60 Hz interlace video signal, the switch 8 is set to the contact "a", and the output of the video demodulation circuit 6 is output to the digital modulation circuit 9. Accordingly, the digital modulation circuit 9 always receives a 60 fields/sec video signal.
<Details of Switch Control Circuit 15—3>
When Playback Apparatus is Connected to 60 Hz Dedicated Monitor 500

Figure 13:
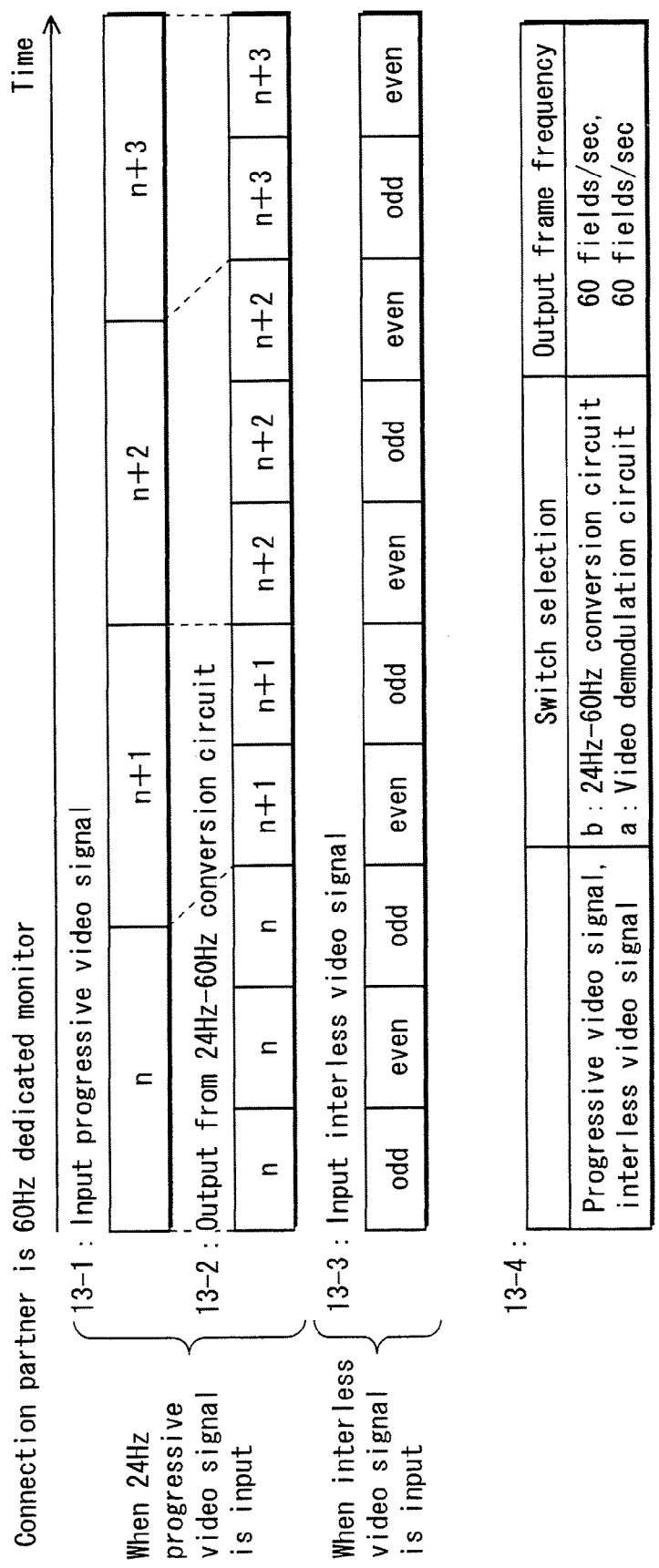
FIG. 13 shows (a) the input/output of the video demodulation circuit 6 and the 24 Hz-60 Hz conversion circuit 7 and (b) the switch control by the switch control circuit 15 in correspondence with each other, in the case where the playback apparatus is connected to the 60 Hz dedicated monitor 500.

FIG. 13 shows (a) the input/output of the video demodulation circuit 6 and the 24 Hz-60 Hz conversion circuit 7 and (b) the switch control by the switch control circuit 15 in correspondence with each other, in the case where the playback apparatus is connected to the 60 Hz dedicated monitor 500.

The rows 13-1 and 13-2 of FIG. 13 indicate the input/output of the 24 Hz-60 Hz conversion circuit 7 when the input signal is the progressive video signal. As shown in the drawing, the 24 Hz-60 Hz conversion circuit 7 converts each frame of the 24 frames/sec video signal, that is shown in the row 13-1, into three fields and two fields, alternately. As a result of this, a 60 fields/sec signal shown in the row 13-2 is obtained. The row 13-3 indicates the 60 Hz interlace video signal that is output to the contact "a" by the through output. The row 13-4 indicates the switch control by the switch control circuit 15 in the case where the input/output of the 24 Hz-60 Hz conversion circuit 7 is as indicated in the rows 13-1 and 13-2.

When the input video signal is judged to be a progressive video signal, the switch 8 is set to the contact "b", and the output of the 24 Hz-60 Hz conversion circuit 7 is output to the digital modulation circuit 9.

When the input video signal is a 60 Hz interlace video signal, the switch 8 is set to the contact "a", and the output of the video demodulation circuit 6 is output to the digital modulation circuit 9. Accordingly, the digital modulation circuit 9 always receives a 60 fields/sec video signal.

As described above, the 60 fields/sec video signal is kept to be output in the continuity priority mode regardless of how the input video signal changes between the progressive video signal and 60 Hz interlace video signal. This eliminates the need to re-synchronize with the monitor, and the output of the video signal does not stop.

Accordingly, the user can select a video output for its purpose. Namely, the user can select the quality priority mode if the user chooses the image quality over the continuity, and can select the continuity priority mode if the user chooses the continuity of the video image over the image quality.

The following explains the implementation by the software of the Clip information read circuit 5, the displayability judging unit 11, the GUI generating unit 12, the mode setting unit 13, and the switch control circuit 15. The Clip information read circuit 5, the displayability judging unit 11, the GUI generating unit 12, the mode setting unit 13, and the switch control circuit 15 can be implemented in the playback apparatus by causing the CPU to execute a program that includes description of the procedures shown in FIGS. 14 and 15.

Figure 14:
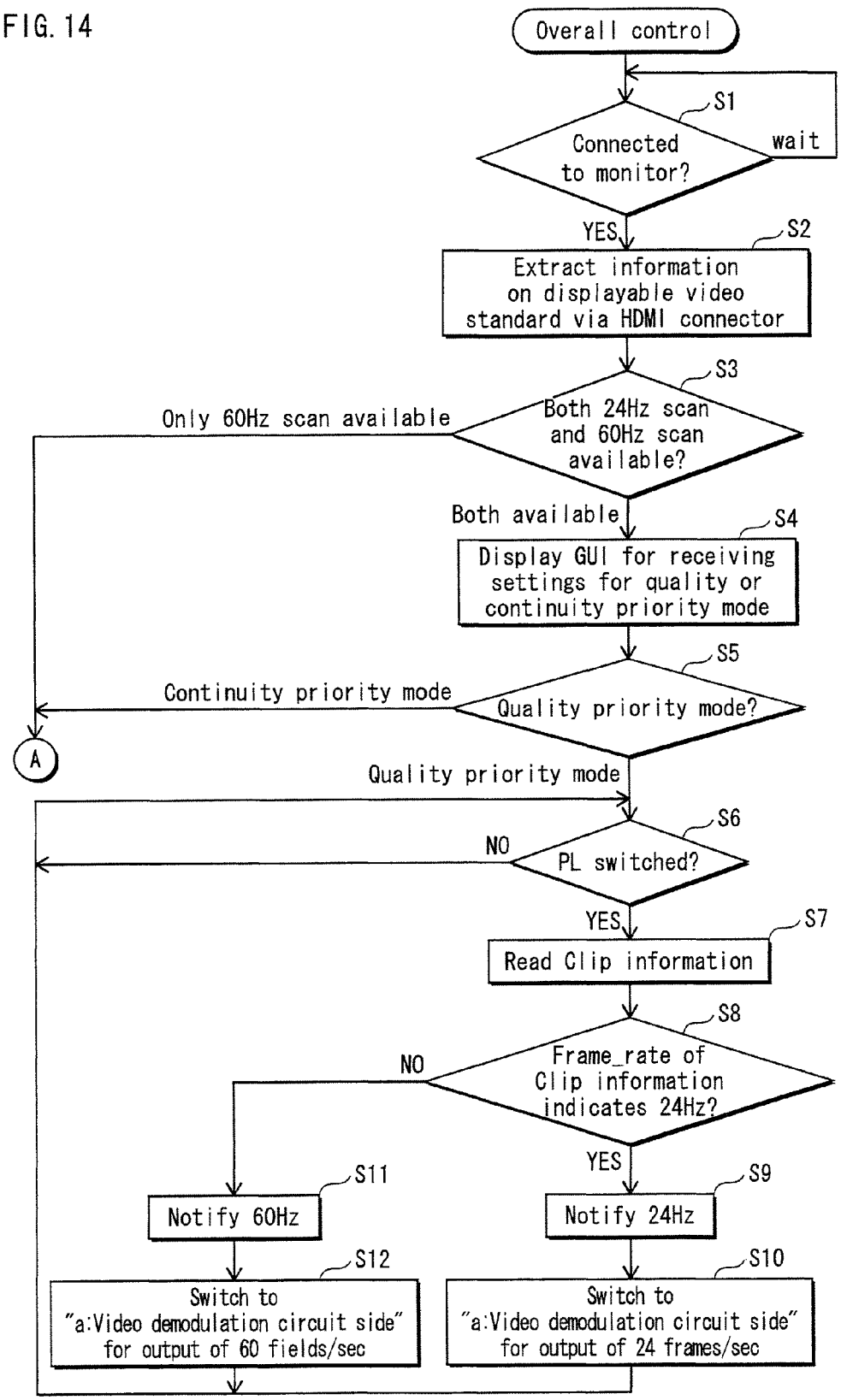
FIG. 14 is a flowchart showing the procedures of the overall control performed by the playback apparatus that includes the Clip information read circuit 5, display ability judging unit 11, GUI generating unit 12, mode setting unit 13, and switch control circuit 15.

FIG. 14 is a flowchart showing the procedures of the overall control performed by the playback apparatus that includes the Clip information read circuit 5, displayability judging unit 11, GUI generating unit 12, mode setting unit 13, and switch control circuit 15. In FIG. 14, after the playback apparatus is activated, control enters a loop composed of step S1 in which it is judged whether or not the playback apparatus has been connected to the monitor. If it is judged in step S1 that the playback apparatus has been connected to the monitor, control moves to step S2 in which the information on the displayable video standard is extracted from the monitor via the serial transmission path for mutual communication conforming to the HDMI standard. In step S3, it is judged, based on the extracted information on the display able video standard, whether to execute the process composed of steps S4-S12 or to execute the process composed of steps S13-S17 shown in FIG. 15.

Figure 15:
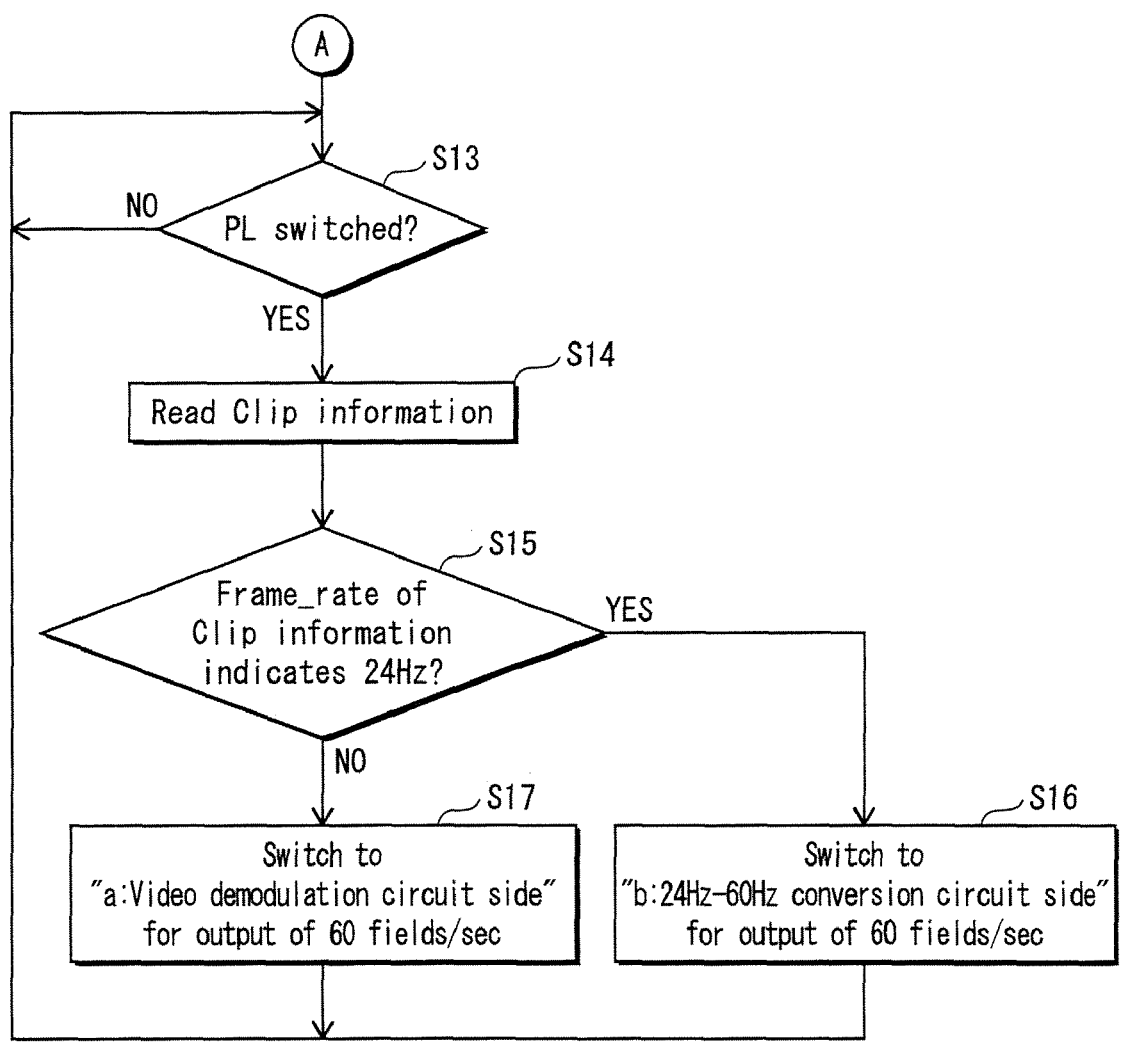
FIG. 15 is a flowchart showing the procedures of the playback apparatus in the case where the playback apparatus is connected to the 60 Hz dedicated monitor 500, or in the case where the playback apparatus has been set to the continuity priority mode.

If it is judged in step S3 that only the 60 Hz scan is available in the monitor being the connection partner, control moves to the flowchart shown in FIG. 15. If it is judged in step S3 that both 24 Hz scan and 60 Hz scan are available in the monitor being the connection partner, control moves to the process composed of steps S4-S12.

In step S4, either the setting for the quality priority mode or the setting for the continuity priority mode is received.

In step S5, it is judged whether the playback apparatus has been set to the quality priority mode or to the continuity priority mode. If it is judged in step S5 that the playback apparatus has been set to the continuity priority mode, control moves to the process shown in FIG. 15. If it is judged in step S5 that the playback apparatus has been set to the quality priority mode, control moves to the process composed of steps S6-S12.

In steps S6-S12, either the process of changing the connection of the switch 8 to the contact "a" for the output of 24 frames/sec (step S10) or the process of changing the connection of the switch 8 to the contact "a" for the output of 60 fields/sec (step S12) is performed, depending on the results of steps S6-S8.

Which of step S10 and step S12 to perform is determined in accordance with result of judgment in step S8.

In step S6, which precedes steps S7 and S8, it is judged whether the playback target has been switched to a new PlayList. If it is judged in step S6 that the playback target has been switched to a new PlayList, control moves to step S7.

In step S7, Clip information of the AVClip that is defined first in the new PlayList is read out.

In step S8, it is judged whether or not the frame_rate defined in the read-out Clip information indicates 24 Hz. If it is judged in step S8 that the frame_rate indicates 24 Hz, control moves to step S9 in which it is notified to the HDMI sync control unit 14 that the frame frequency of the video signal is 24 Hz, and then control moves to step S10. If it is judged in step S8 that the frame_rate does not indicate 24 Hz, control moves to step S11 in which it is notified to the HDMI sync control unit 14 that the frame frequency of the video signal is 60 Hz, and then step S12 is performed. Thereafter, the process of steps S6-S12 is repeated in so far as the input of the video signal continues. Up to now, the flowchart of FIG. 14 has been explained.

FIG. 15 is a flowchart showing procedures of the playback apparatus that are performed when the connection partner is the 60 Hz dedicated monitor 500 or when the playback apparatus has been set to the continuity priority mode.

In this flowchart, either the process of changing the connection of the switch 8 to the contact "b" (step S16) or the process of changing the connection of the switch 8 to the contact "a" (step S17) is performed, depending on the results of steps S13-S15.

Which of step S16 and step S17 to perform is determined in accordance with result of judgment in step S15.

In step S13, which precedes steps S14 and S15, it is judged whether the playback target has been switched to a new PlayList. If it is judged in step S13 that the playback target has been switched to a new PlayList, control moves to step S14.

In step S14, Clip information of the AVClip that is defined first in the new PlayList is read out.

In step S15, it is judged whether or not the frame_rate defined in the read-out Clip information indicates 24 Hz. If it is judged in step S15 that the frame_rate indicates 24 Hz, step S16 is performed. If it is judged in step S15 that the frame_rate does not indicate 24 Hz, step S17 is performed. Thereafter, the process of steps S13-S17 is repeated in so far as the input of the video signal continues. Up to now, the flowchart of FIG. 15 has been explained.

As described above, according to the present embodiment, it is possible to change the frame frequency at which the video signal is output, by detecting (i) the frame frequency of the video signal obtained for a playback and (ii) the frame frequencies supported by the monitor that is connected to the playback apparatus. Also, the user can choose the image quality over the continuity or can choose the continuity of the played back video over the image quality. Such a structure of the present embodiment can prevent occurrence of a problem that images are not output, output images are not of a proper quality, or the image output is interrupted, which would occur depending on the combination of (i) the frame frequency of the video signal obtained for a playback and (ii) the frame frequencies supported by the monitor that is connected to the playback apparatus.

The playback apparatus 200 of the present embodiment notifies the user, by a warning on the GUI that receives a mode setting from the user, that, when the playback apparatus 200 is set to the quality priority mode, the displayed image may be interrupted when the frequency is switched. With this structure, the user can easily presume a cause of an interruption of a displayed image when the interruption occurs due to a switch of the frequency.

However, if the user continues to view, for a long period, only optical discs that do not contain a progressive video signal, after the playback apparatus is set to the quality priority mode, the user might forget the warning. In this situation, if the user views, after a long time, a movie or the like in which the 60 Hz interlace signal and the progressive video signal are mixed, and if an interruption of a displayed image occurs due to a switch of the frequency, the user might not be able to assume the cause of the interruption and might be confused.

The following describes a modification in which a GUI for receiving a mode setting is displayed to help the user who cannot assume the cause of an interruption when the interruption occurs due to a switch of the frequency. The present modification can be implemented in the playback apparatus by creating a program for achieving the procedures shown in FIGS. 15 and 16 and causing the CPU to execute the program.

Figure 16:
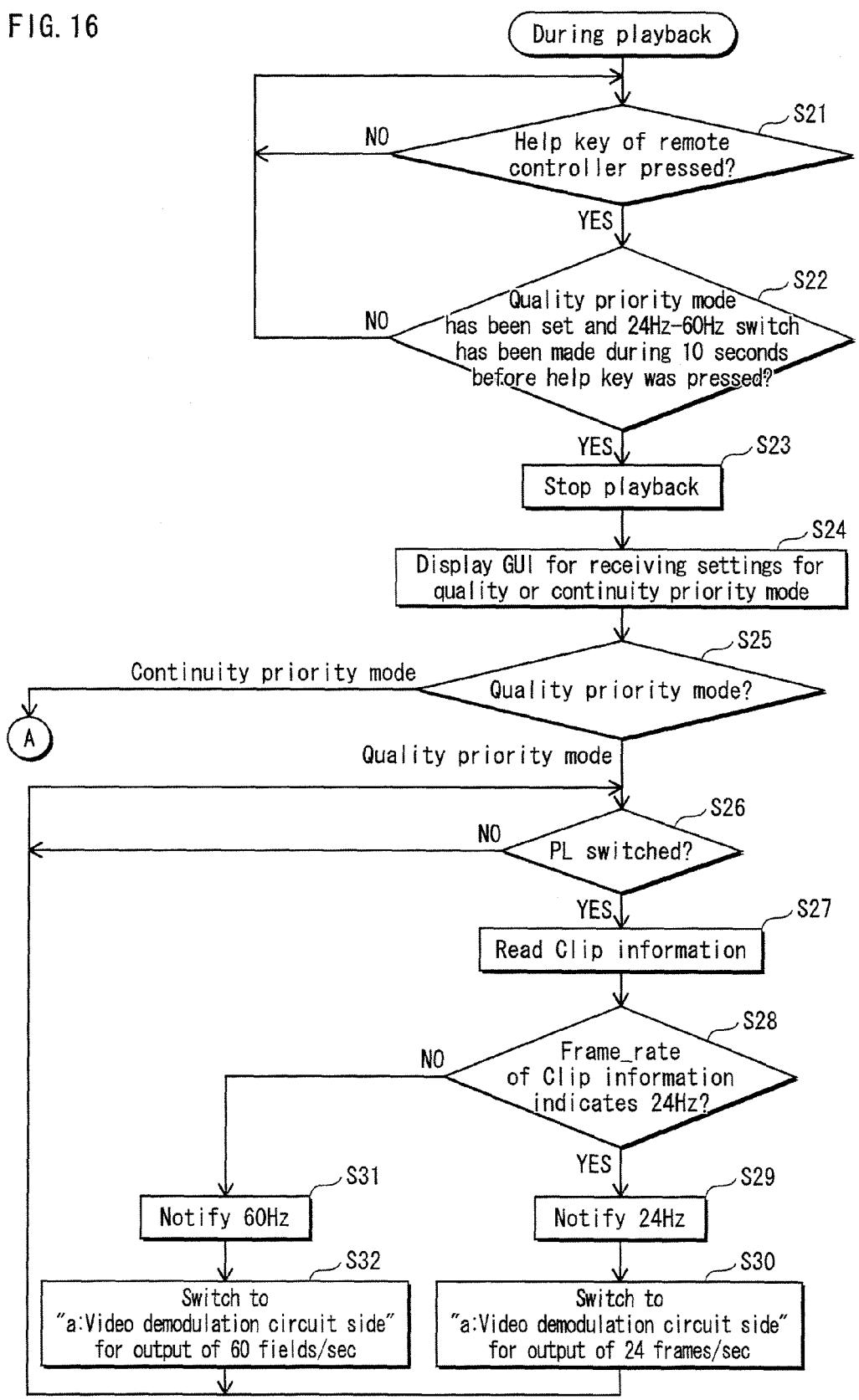
FIG. 16 is a flowchart showing procedures of a modification of Embodiment 1.

In FIG. 16, a loop composed of steps S21 to S22 is executed during an execution of a playback process. In step S21, it is judged whether or not a help key of the remote controller 300 has been pressed. If it is judged that the help key has been pressed, control moves to step S22. To make a judgment in step S22, the operation mode of the playback apparatus itself and the operation history of the HDMI sync control unit 14 are checked.

If it is judged that the playback apparatus is in the quality priority mode, and that the HDMI sync control unit 14 had performed the re-synchronization according to the HDMI standard during 10 seconds before the help key was pressed, due to a switch of the frame frequency (Yes in step S22), it is assumed that the user pressed the help key because the user could not assume the cause of an interruption when the interruption occurred due to a switch of the frame frequency. In this case, the playback process is stopped (step S23), the GUI generating unit 12 is caused to generate a GUI for receiving a mode setting shown in FIG. 9, and a setting to either the quality priority mode or the continuity priority mode is received from the user (step S24). With these procedures, it is possible to timely provide the user with a warning about a problem that the displayed image may be interrupted when the frequency is switched while the playback apparatus is set to the quality priority mode, and with a solution to the problem.

After step S24, step S25 and onwards, which are the same as step S5 and onwards shown in FIG. 14 and the steps shown in FIG. 15, are performed to resume the playback process.

As described above, the present modification gives the user a chance to set either of the modes, showing the user a way to solve the above-described problem.

<Embodiment 2>

In Embodiment 2, it is presumed that a multi-frame monitor is used. The multi-frame monitor is a monitor that displays images at a scan frequency in accordance with an instruction provided from the playback apparatus. In Embodiment 2, the multi-frame monitor scans at 48 Hz, which is an integral multiple of 24 (frames/sec), during a video playback. The video signals recorded on films are suitable for display at 24 frames/sec as described in Embodiment 1. However, a flickering may occur during a display at 24 frames/sec. In movie theaters, the film is moved so that each frame is exposed to light twice to avoid such a flickering. Accordingly, if the playback apparatus plays back the video signal at 48 frames/sec in the present embodiment, the quality of the displayed image is close to the quality of the image displayed in the movie theater.

Figure 17:
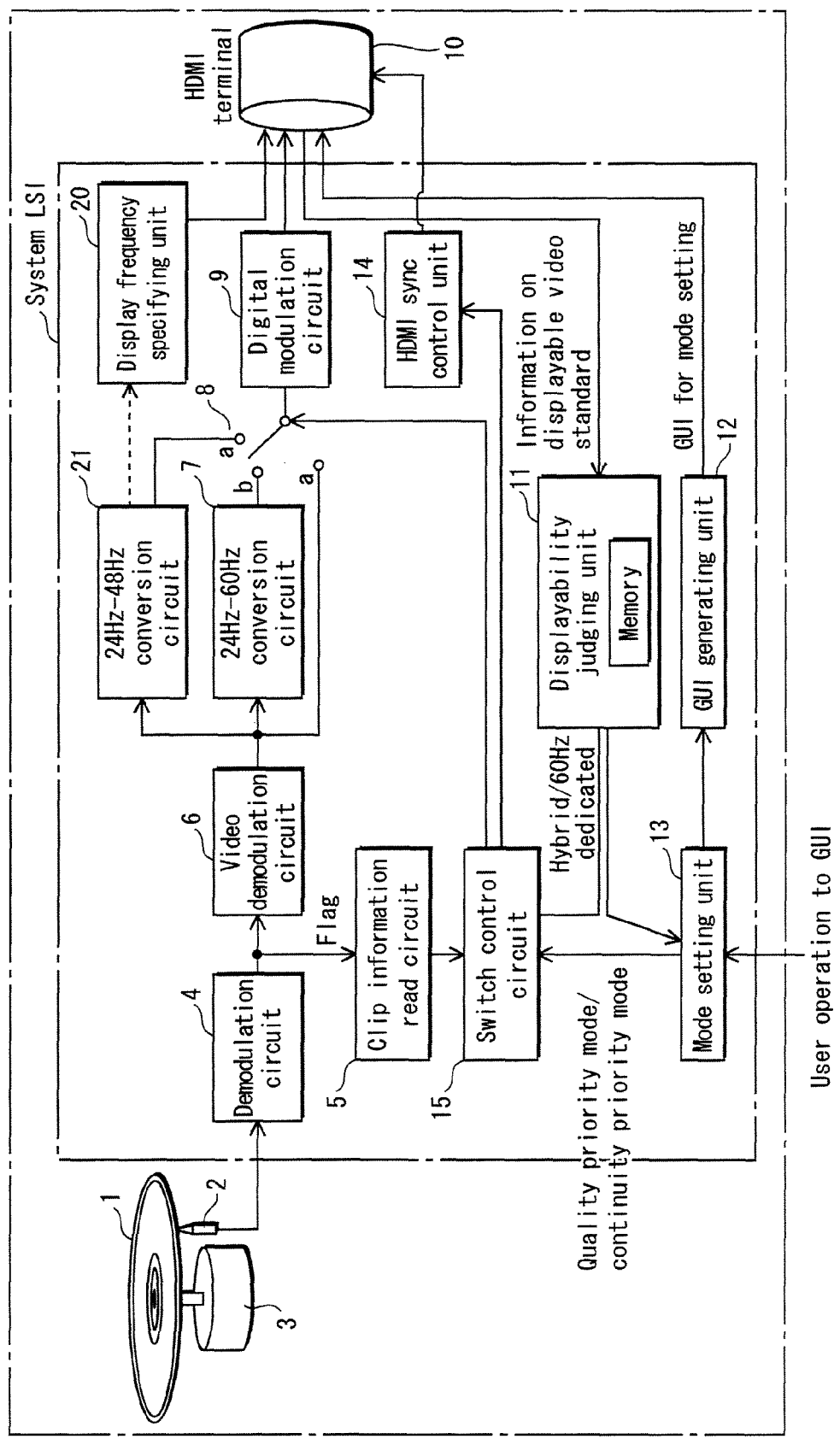
FIG. 17 shows the internal structure of the playback apparatus in Embodiment 2.

The following describes the internal structure of the playback apparatus in Embodiment 2. FIG. 17 shows the internal structure of the playback apparatus in Embodiment 2. As shown in FIG. 17, the playback apparatus of Embodiment 2 additionally includes a display frequency specifying unit 20 and a 24 Hz-48 Hz conversion circuit 21. Also, with the addition of these structural elements, the displayability judging unit 11 and the switch control circuit 15 perform the following processes that are unique to Embodiment 2. Here, these improvements and additional structural elements will be described.

<Improvement of Displayability Judging Unit 11 in Embodiment 2>

The displayability judging unit 11 extracts the "information on the displayable video standard of the monitor" from the ROM within the monitor, via the serial transmission path, and judges, based on the extracted information, whether the monitor being the connection partner is a multi-frame monitor.

<Display Frequency Specifying Unit 20>

The display frequency specifying unit 20, if the display ability judging unit 11 judges that the connection partner monitor is a multi-frame monitor, notifies, via the HDMI, the connection partner display apparatus of a scan frequency at which the display should be performed. It should be noted here that the "scan frequency at which the display should be performed" means the "48 frames/sec". That is to say, the display frequency specifying unit 20 instructs the display apparatus to display at 48 frames/sec, and the playback apparatus causes the 24 Hz-48 Hz conversion circuit 21 to output signals at 48 frames/sec, in the quality priority mode.

<24 Hz-48 Hz Conversion Circuit 21>

Figure 18:
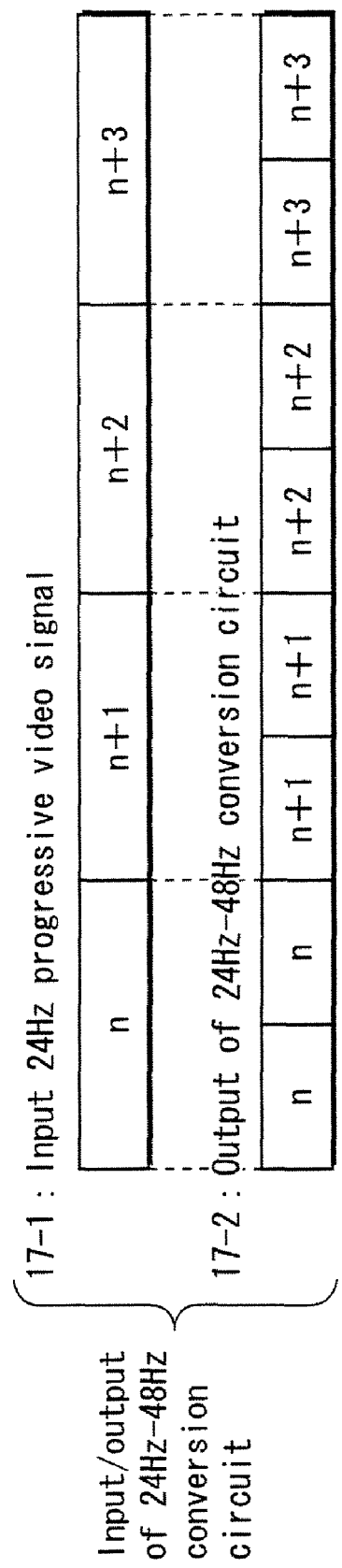
FIG. 18 shows the input and output of the 24 Hz-48 Hz conversion circuit 21.

The 24 Hz-48 Hz conversion circuit 21 converts the progressive video signal output from the 6 to a video signal of 48 frames/sec. FIG. 18 shows the input and output of the 24 Hz-48 Hz conversion circuit 21. In FIG. 18, the row 17-1 indicates a signal (progressive video signal) that is input to the 24 Hz-48 Hz conversion circuit 21, and the row 17-2 indicates a signal that is output from the 24 Hz-48 Hz conversion circuit 21. It is understood from FIG. 18 that frames n, n+1, n+2 of the progressive video signal shown in the row 17-1 are converted into frames n, n, n+1, n+1, n+2, n+2.

<Improvement of Switch Control Circuit 15 in Embodiment 2>

The switch control circuit 15 performs a process that is unique to Embodiment 2 if the connection partner monitor is a multi-frame monitor and the playback apparatus is in the quality priority mode.

Figure 19:
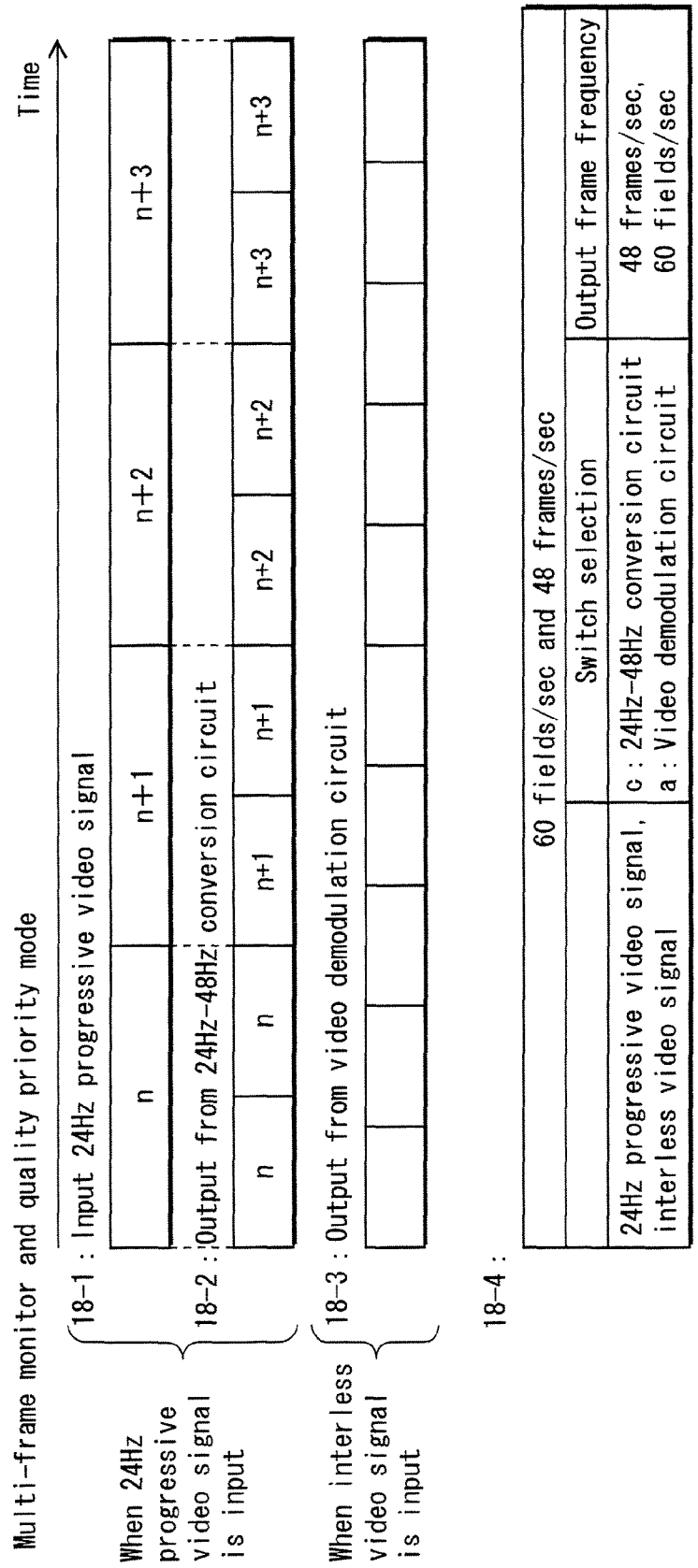
FIG. 19 shows (a) the input/output of the 24 Hz-48 Hz conversion circuit 21 and (b) the switch control by the switch control circuit 15 in correspondence with each other, in the case where the connection partner monitor is a multi-frame monitor and the playback apparatus is in the quality priority mode.

When the playback apparatus receives a progressive video signal as an input signal in the quality priority mode, the switch control circuit 15 controls the switch 8 as shown in FIG. 19 so that the video signal of 48 frames/sec received from the 24 Hz-48 Hz conversion circuit 21 is output to the hybrid monitor 400.

FIG. 19 shows (a) the input/output of the 24 Hz-48 Hz conversion circuit 21 and (b) the switch control by the switch control circuit 15 in correspondence with each other, in the case where the connection partner monitor is a multi-frame monitor and the playback apparatus is in the quality priority mode. The rows 18-1 and 18-2 of FIG. 19 indicate the input/output of the 24 Hz-48 Hz conversion circuit 21. The row 18-3 indicates the output from the video demodulation circuit 6 when the 60 Hz interlace video signal is input. According to FIG. 19, when the 60 Hz interlace video signal is input, the 60 Hz interlace video signal is output. Also, when the progressive video signal is input, the 48 Hz progressive video signal is input as shown in the row 18-2.

The row 18-4 indicates the switch control by the switch control circuit 15 in the case where the input/output of the 24 Hz-48 Hz conversion circuit 21 is as indicated in the rows 18-1 and 18-2.

When the input video signal is judged to be a progressive video signal, the switch control circuit 15 sets the switch 8 to the contact "c", and the output of the 24 Hz-48 Hz conversion circuit 21 is output to the digital modulation circuit 9.

When the input video signal is a 60 Hz interlace video signal, the switch control circuit 15 sets the switch 8 to the contact "a", and the output of the video demodulation circuit 6 is output to the digital modulation circuit 9. Accordingly, when the playback apparatus receives the progressive video signal in the in the quality priority mode, the video signal is output at 48 frames/sec. Also, when the playback apparatus receives the 60 Hz interlace video signal, the switch 8 is set to the contact "c", and the 60 Hz interlace video signal is output.

Figure 20:
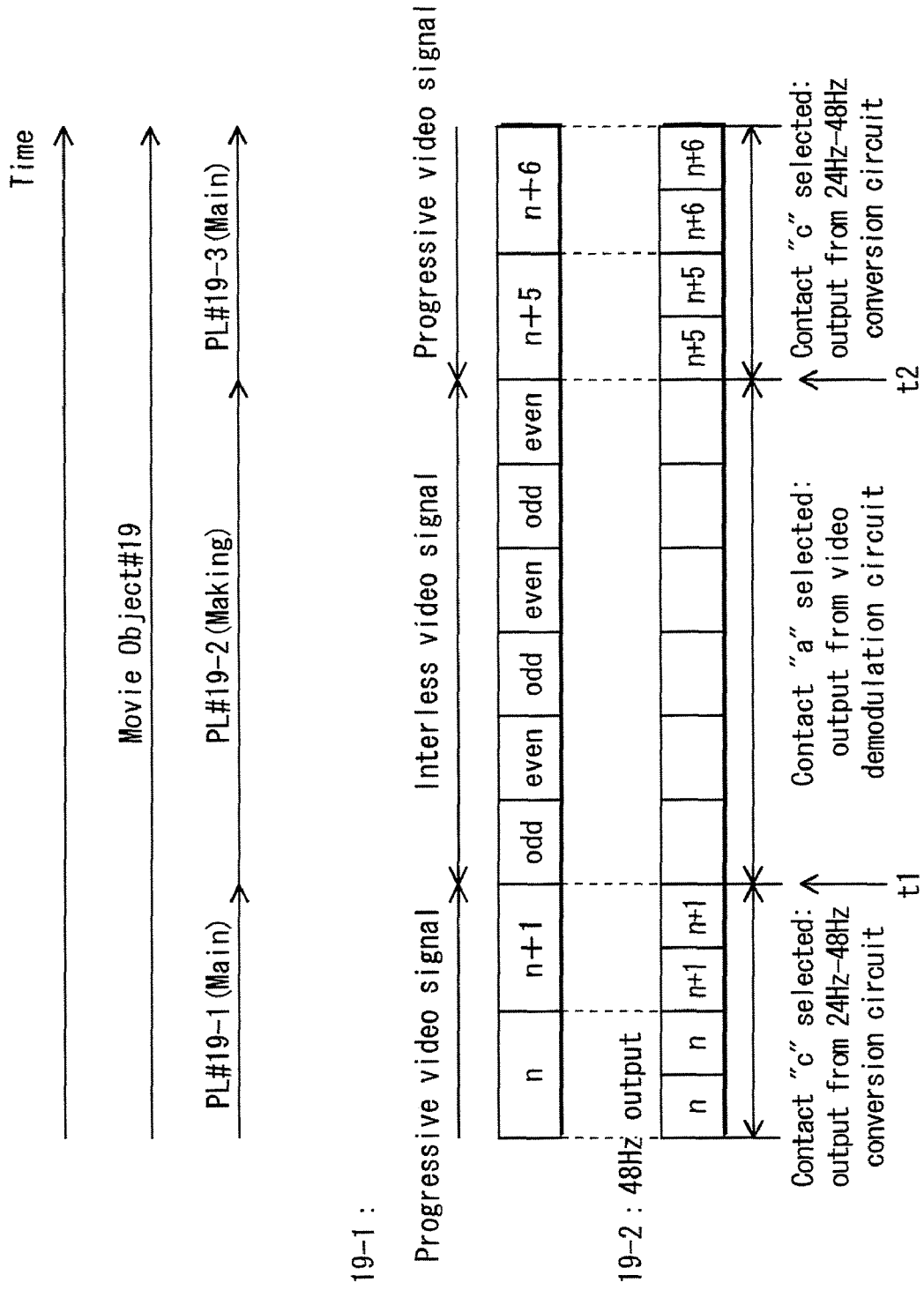
FIG. 20 shows operations at changes between the progressive video signal and the interlace video signal.

The following describes the change in the frame frequency of the video signal when it is output in the quality priority mode. FIG. 20 shows operations at changes between the progressive video signal and the interlace video signal. In general, in the case where the video signal of the main movie recorded on the optical disc 1 has been made from a movie material is recorded on a film, a switch between the progressive video signal and the 60 Hz interlace video signal may happen when PlayLists change, as indicated in the row 19-1 of FIG. 20. Such a switch happens when a Movie Object, which is a combination of (a) a main movie composed of 24 frames/sec frames n, n+1, n+5, and n+6 and (b) a "making" of the movie composed of a 60 Hz interlace video signal, is played back.

In Movie Object#19 shown in FIG. 20, a switch from PL#19-1 of the progressive video signal to PL#19-2 of the interlace video signal happens at change point t1, and then it switches to PL#19-3 of the progressive video signal at change point t2.

At the change points t1 and t2, the Clip information read circuit 5 starts to read the Clip information, and the switch is set from the contact "c" to the contact "a", and then set from the contact "a" to the contact "c", respectively. In correspondence with this, the output changes from the 48 Hz progressive video signal to the 60 Hz interlace video signal, and then changes to the 48 Hz progressive video signal, respectively. Accordingly, the video is interrupted at these change points.

For this reason, even if the playback apparatus outputs a signal at 48 frames/sec, the process of Embodiment 1 is required. That is to say, if the connection partner monitor is a multi-frame monitor, the mode setting unit 13 causes the GUI generating unit 12 to display a GUI. And if the user answers positively despite the warning, it becomes necessary to output a signal at 48 frames/sec.

As described above, according to the present embodiment, it is possible to cause the display apparatus to display at 48 frames/sec, allowing the user to enjoy as high image quality as in the movie theater. Furthermore, if a display is interrupted due to an occurrence of a change between the 48 Hz progressive video signal and the 60 Hz interlace video signal, it would not develop into a claim against the product.

<Embodiment 3>

In Embodiment 3, as is the case with Embodiment 2, it is presumed that a multi-frame monitor is used. The multi-frame monitor is a monitor that displays images at a scan frequency in accordance with an instruction provided from the playback apparatus. In Embodiment 3, the multi-frame monitor scans at 72 Hz, which is an integral multiple of 24 (frames/sec), during a video playback.

Figure 21:
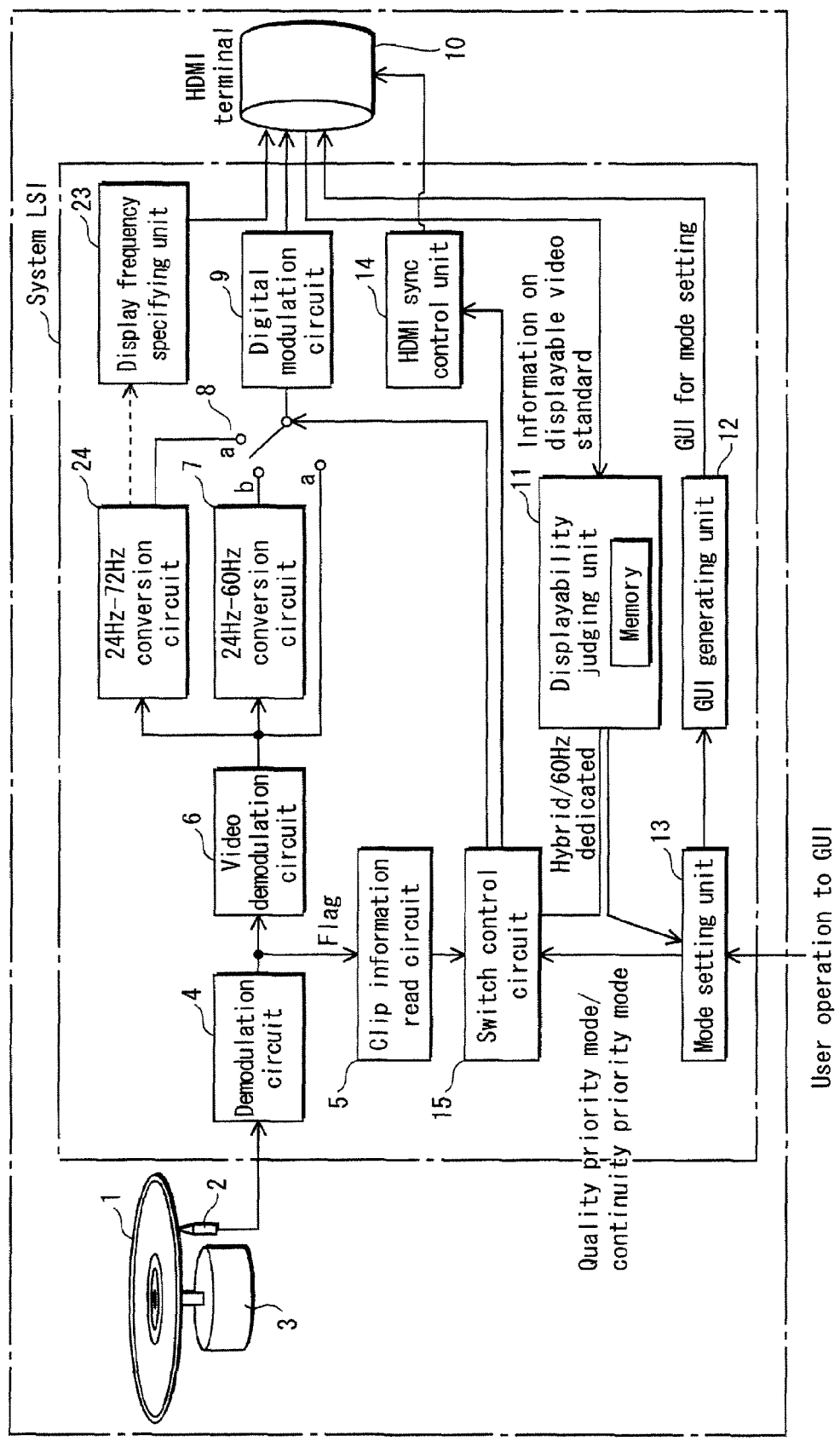
FIG. 21 shows the internal structure of the playback apparatus in Embodiment 3.

The following describes the internal structure of the playback apparatus in Embodiment 3. FIG. 21 shows the internal structure of the playback apparatus in Embodiment 3. FIG. 21 is based on the internal structure of the playback apparatus of Embodiment 2 shown in FIG. 17. The difference from FIG. 17 is that the 24 Hz-48 Hz conversion circuit 21 has been replaced with a 24 Hz-72 Hz conversion circuit 24. Also, with the addition or replacement of the structural elements, the displayability judging unit 11 and the switch control circuit 15 perform the following processes that are unique to Embodiment 3. Here, these improvements and additional structural elements will be described.

<Improvement of Displayability Judging Unit 11 in Embodiment 3>

The displayability judging unit 11 extracts the "information on the displayable video standard of the monitor" from the ROM within the monitor, via the serial transmission path, and judges, based on the extracted information, whether the monitor being the connection partner is a multi-frame monitor.

<Display Frequency Specifying Unit 23>

The display frequency specifying unit 20, if the display ability judging unit 11 judges that the connection partner monitor is a multi-frame monitor, notifies, via the HDMI, the connection partner display apparatus of a scan frequency of 72 frames/sec at which the display should be performed. That is to say, the display frequency specifying unit 23 instructs the display apparatus to display at 72 frames/sec, and the playback apparatus causes the 24 Hz-72 Hz conversion circuit 24 to output signals at 72 frames/sec, in the quality priority mode.

<24 Hz-72 Hz Conversion Circuit 24>

The 24 Hz-72 Hz conversion circuit 24 converts the progressive video signal output from the video demodulation circuit 6 to a video signal of 72 frames/sec. FIG. 22 shows the input and output of the 24 Hz-72 Hz conversion circuit 24. In FIG. 22, the row 21-1 indicates a signal (progressive video signal) that is input to the 24 Hz-72 Hz conversion circuit 24, and the row 21-2 indicates a signal that is output from the 24 Hz-72 Hz conversion circuit 24. It is understood from FIG. 22 that frames n, n+1, n+2 of the progressive video signal shown in the row 21-1 are converted into frames n, n, n, n+1, n+1, n+1, n+2, n+2, n+2.

Up to now, the 24 Hz-72 Hz conversion circuit 24 has been described. Since, in the present embodiment, the 24 Hz-48 Hz conversion circuit 21 has been replaced with a 24 Hz-72 Hz conversion circuit 24, the switch control circuit 15 performs as follows.

<Improvement of Switch Control Circuit 15 in Embodiment 3>

The switch control circuit 15 controls the switch 8 as shown in FIG. 22, row 21-3. The row 21-3 indicates the switch control by the switch control circuit 15 in Embodiment 3.

When the playback apparatus is in the quality priority mode, and the input video signal is judged to be a progressive video signal, the switch control circuit 15 sets the switch 8 to the contact "c", and the output of the 24 Hz-72 Hz conversion circuit 21 is output to the digital modulation circuit 9. With this operation, the video signal is output to the monitor at 72 frames/sec.

When the playback apparatus is in the quality priority mode, and the input video signal is a 60 Hz interlace video signal, the switch control circuit 15 sets the switch 8 to the contact "a", and the output of the video demodulation circuit 6 is output to the digital modulation circuit 9.

As described above, according to the present embodiment, it is possible to cause the display apparatus, which is connected to the playback apparatus, to display at 72 frames/sec. Furthermore, if a disorder or an interruption of a display occurs because an interlace video signal is mixed with a progressive video signal, it would not develop into a claim against the product.

<Supplementary Notes>

Up to now, the preferred embodiments of the present invention, as far as known to the applicant at this time of filing the present application, have been described. However, further improvements or modifications can be made on the present invention in terms of the following technical topics. It should be noted here that whether or not to make such improvements or modifications is optional, and depends on the implementer of the invention.

<Realization of Control Procedure>

Both the control procedures explained in the above-described embodiments using the flowcharts and the control procedures of the functional components explained in the above-described embodiments satisfy the requirements for the "program invention" since the above-mentioned control procedures are realized concretely using the hardware resources and are the creation of a technical idea utilizing natural laws.

Production of Program of Present Invention

The program of the present invention can be produced as follows. First, the software developer writes, using a programming language, a source program that achieves each flowchart and functional component. In this writing, the software developer uses the class structure, variables, array variables, calls to external functions, and soon, which conform to the sentence structure of the programming language he/she uses.

The written source program is sent to the compiler as files. The compiler translates the source program and generates an object program.

The translation performed by the compiler includes processes such as the sentence structure analysis, optimization, resource allocation, and code generation. In the sentence structure analysis, the characters and phrases, sentence structure, and meaning of the source program are analyzed and the source program is converted into an intermediate program. In the optimization, the intermediate program is subjected to such processes as the basic block setting, control flow analysis, and data flow analysis. In the resource allocation, to adapt to the instruction sets of the target processor, the variables in the intermediate program are allocated to the register or memory of the target processor. In the code generation, each intermediate instruction in the intermediate program is converted into a program code, and an object program is obtained.

The generated object program is composed of one or more program codes that cause the computer to execute each step in the flowchart or each procedure of the functional components. There are various types of program codes such as the native code of the processor, and Java™ byte code. There are also various forms of realizing the steps of the program codes. For example, when each step can be realized by using an external function, the call statements for calling the external functions are used as the program codes. Program codes that realize one step may belong to different object programs. In the RISC processor in which the types of instructions are limited, each step of flowcharts may be realized by combining arithmetic operation instructions, logical operation instructions, branch instructions and the like.

After the object program is generated, the programmer activates a linker. The linker allocates the memory spaces to the object programs and the related library programs, and links them together to generate a load module. The generated load module is based on the presumption that it is read by the computer and causes the computer to execute the procedures indicated in the flowcharts and the procedures of the functional components. The program of the present invention can be produced in this way.

Use of Program of Present Invention

The program of the present invention can be used as follows.

(i) Used as Embedded Program

When the program of the present invention is used as an embedded program, the load module as the program is written into an instruction ROM, together with the Basic Input/Output System (BIOS) program and various pieces of middleware (operation systems). The program of the present invention is used as the control program of the playback apparatus as the instruction ROM is embedded in the control unit and is executed by the CPU.

(ii) Used as Application

When the playback apparatus is a hard-disk-embedded model, the Basic Input/Output System (BIOS) program is embedded in an instruction ROM, and various pieces of middleware (operation systems) are preinstalled in the hard disk. Also, a boot ROM for activating the system from the hard disk is provided in the playback apparatus.

In this case, only the load module is supplied to the playback apparatus via a transportable recording medium and/or a network, and is installed in the hard disk as one application. This enables the playback apparatus to perform the bootstrapping by the boot ROM to activate an operation system, and then causes the CPU to execute the installed load module as one application so that the program of the present application can be used.

As described above, when the playback apparatus is a hard-disk-embedded model, the program of the present invention can be used as one application. Accordingly, it is possible to transfer, lend, or supply, via a network, the program of the present invention separately.

<Realization of Demodulation Circuit 4 through Switch Control Circuit 15>

Each of the demodulation circuit 4 through the switch control circuit 15 described in each embodiment can be realized separately as one system LSI. Also, the demodulation circuit 4 through the switch control circuit 15 as a whole can be realized as one system LSI.

The system LSI is obtained by implementing a bear chip on a high-density substrate and packaging them. The system LSI is also obtained by implementing a plurality of bear chips on a high-density substrate and packaging them, so that the plurality of bear chips have an outer appearance of one LSI (such a system LSI is called a multi-chip module).

The system LSI has a QFP (Quad Flat Package) type and a PGA (Pin Grid Array) type. In the QFP-type system LSI, pins are attached to the four sides of the package. In the PGA-type system LSI, a lot of pins are attached to the entire bottom.

These pins function as an interface with other circuits. The system LSI, which is connected with other circuits through such pins as an interface, plays a role as the core of the playback apparatus.

The bear chip packaged in the system LSI includes a front-end unit, a back-end unit, and a digital processing unit. The front-end unit digitizes analog signals. The back-end unit converts digital data obtained through digital processes into the analog format and outputs the analog data.

The internal-structure components shown in the above-described embodiments are implemented in the digital processing unit.

As described above in "Used as Embedded Program", the load module as the program, the Basic Input/Output System (BIOS) program and various pieces of middleware (operation systems) are written into an instruction ROM. The major improvement of the embodiments is achieved by the load module as the program. It is therefore possible to produce a system LSI of the present invention by packaging the instruction ROM, in which the load module as the program is stored, as the bear chip.

In regards with a specific implementation method, it is preferable to use the SoC implementation or the SiP implementation. The SoC (System on Chip) implementation is a technology for printing a plurality of circuits onto a chip. The SiP (System in Package) implementation is a technology for packaging a plurality of circuits by resin or the like. Through these processes, a system LSI of the present invention can be produced based on the internal structure of the playback apparatus described in each embodiment above.

It should be noted here that although the term LSI is used here, it may be called IC, LSI, super LSI, ultra LSI or the like, depending on the level of integration.

Further, part or all of the components of each playback apparatus may be achieved as one chip. The integrated circuit is not limited to the SoC implementation or the SiP implementation, but may be achieved by a dedicated circuit or a general purpose processor. It is also possible to achieve the integrated circuit by using the FPGA (Field Programmable Gate Array) that can be re-programmed after it is manufactured, or a reconfigurable processor that can reconfigure the connection and settings of the circuit cells inside the LSI.

Furthermore, a technology for an integrated circuit that replaces the LSI may appear in the near future as the semiconductor technology improves or branches into another technologies. In that case, the new technology may be incorporated into the integration of the functional blocks constituting the present invention as described above. Such possible technologies include biotechnology.

<Types of Recording Mediums>

In Embodiment 1, the disc 1, a recording medium, is explained to be a playback dedicated optical disc, as on example. However, the recording medium of the present invention is not limited to a certain recording method or to a certain recording format. Also, the optical pickup 2 and the motor 3 are necessary when the disc 1 is used. However, when another recording medium of a different type or format, such as a semiconductor memory card, is used, an appropriate means for driving the recording medium and/or an appropriate means for recording/playing back signals on the recording medium may be used.

<Frame Frequency>

In Embodiments 1 through 3, a case where the video signals are output at a frequency of an integral multiple of 24 Hz and at 60 Hz are described. However, the present invention can be applied to a case where the video signal is output at other frequencies. For example, the advantageous effects of the present invention can be obtained similarly if the present invention is applied to a case where the video signals are output at a frequency of an integral multiple of 24000/1001 Hz and at 60000/1001 Hz, where this case is used in a large number of actual video apparatuses.

<Mode Setting>

In Embodiments 1 through 3, a mode setting is received via a GUI. However, the present invention can be applied to a case where another method is used to receive the mode setting. For example, the playback apparatus may be provided with a microphone and a sound/voice analyzing unit, and a mode setting may be received with use of a navigation by sounds/voices and an input by sounds/voices, instead of via the GUI.

Further, the advantageous effects of the present invention can be obtained similarly if an operational panel, which is disposed on the front side of the playback apparatus, is provided with a button for switching between the quality priority mode and the continuity priority mode so that the mode setting can be changed at any timing by operating the button. Further, the present invention can be implemented if a dip switch is used to switch between the quality priority mode and the continuity priority mode.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A playback apparatus for obtaining a video signal from video information read out from a recording medium and outputting the obtained video signal to a display apparatus, the playback apparatus comprising:
    a video signal judging unit operable to read supplementary information, which indicates whether a frame frequency of the video signal is a first frame frequency or a second frame frequency, from the recording medium and judge whether the video signal is of the first frame frequency or of the second frame frequency;
    a mode setting unit operable to set an operation mode of the playback apparatus to either a continuation mode in which there are no switching between frame frequencies during playback or a non-continuation mode in which switching between frame frequencies is allowed during playback, as selected by a user;
    a playback unit operable to, if the mode setting unit sets the operation mode to the continuation mode,
    if the video signal judging unit judges that the obtained video signal is of the first frame frequency, output the obtained video signal and
    if the video signal judging unit judges that the obtained video signal is of the second frame frequency, generate a video signal of the first frame frequency by converting the obtained video signal and output the generated video signal; and
    a sync control unit operable to, in a state where the mode setting unit has set the operation mode to the non-continuation mode, before switching a frame frequency of the video signal that is output during a playback, execute a synchronization process with the display apparatus in accordance with a frame frequency after the switching, wherein
    the first frame frequency is not an integral multiple of the second frame frequency.

2. The playback apparatus of claim 1, wherein
    a playback process is performed in a unit of a play list that specifies a different playback start point and a different playback end point for each of one or more pieces of the video information,
    each of the one or more pieces of the video information, for which a different playback start point and a different playback end point are specified by the play list, has a same frame frequency, and
    the video signal judging unit, during the playback process of the play list, uses a judgment result, which is made according to a piece of supplementary information associated with one of the one or more pieces of the video information, as a judgment result with respect to each of the one or more pieces of the video information.

3. The playback apparatus of claim 1, wherein
    the playback apparatus is connected with the display apparatus via a predetermined interface,
    the playback apparatus further comprising
        a connection partner judging unit operable to extract information regarding a video standard via the predetermined interface from the display apparatus, and to judge based on the extracted information whether the display apparatus has only a first display capability of displaying at the first frame frequency or has the first display capability and a second display capability of displaying at the second frame frequency, wherein
        the mode setting unit performs the setting if the connection partner judging unit judges that the display apparatus has the first and second display capabilities.

4. The playback apparatus of claim 1 further comprising
    a GUI generating unit operable to generate a graphical user interface that (i) provides to the user a warning that a disturbance may happen to a display on the display apparatus if a video signal of the first frame frequency and a video signal of the second frame frequency are continuously output in the non-continuation mode, and (ii) urges the user to select an operation mode, and operable to display the graphical user interface on the display apparatus, wherein
    the mode setting unit receives a selection by the user of the non-continuation mode or the continuation mode via the graphical user interface.

5. The playback apparatus of claim 4, wherein
the graphical user interface includes a first image status for receiving a selection by the user of the continuation mode and a second image status for receiving a selection by the user of the non-continuation mode,
the GUI generating unit generates the graphical user interface to initially display the first image status,
the first and second image status can be switched with each other by an operation of the user.

6. The playback apparatus of claim 1, wherein:
the playback unit outputs the obtained video signal at the first frame frequency if the mode setting unit sets the operation mode to the non-continuation mode and if the video signal judging unit judges that the obtained video signal is of the first frame frequency; and
the playback unit instructs the display apparatus to display at a predetermined frame frequency, generates a video signal of the predetermined frame frequency by converting the obtained video signal, and outputs the generated video signal if the mode setting unit sets the operation mode to the non-continuation mode and if the video signal judging unit judges that the obtained video signal is of the second frame frequency.

7. The playback apparatus of claim 6, wherein
the predetermined frame frequency is an integral multiple of 24 Hz, and
the playback apparatus further comprises
a frame frequency converting circuit that converts a video signal of the second frame frequency, that is input to the playback apparatus, to a video signal of a frame frequency of an integral multiple of 24 Hz, and outputs the converted video signal.

8. A playback apparatus for obtaining a video signal by reading out video information from a recording medium, and outputting the video signal to a display apparatus, the playback apparatus comprising:
a video signal judging unit operable to judge whether a frame frequency of the video signal is a first frame frequency or a second frame frequency;
a mode setting unit operable to set an operation mode of the playback apparatus to either a first mode or a second mode as selected by a user, wherein a switching between frame frequencies is not caused during a playback in the first mode, and the switching between frequencies may be caused during a playback in the second mode;
a playback unit operable to, if the mode setting unit sets the operation mode to the first mode,
if the video signal judging unit judges that the obtained video signal is of the second frame frequency, generate a video signal of the first frame frequency by converting the obtained video signal and output the generated video signal; and
a GUI generating unit operable to generate a graphical user interface that (i) provides to the user a warning concerning a demerit that may occur if the switching between frequencies is caused during a playback in the second mode, and (ii) urges the user to select the operation mode, and operable to display the graphical user interface on the display apparatus, wherein
the mode setting unit receives a selection by the user of the first mode or the second mode via the graphical user interface.

9. The playback apparatus of claim 8, wherein
the graphical user interface includes a first image status for receiving a selection by the user of the first mode and a second image status for receiving a selection by the user of the second mode,
the GUI generating unit generates the graphical user interface to initially display the first image status,
the first and second image status can be switched with each other by an operation of the user.

10. A playback apparatus for outputting a video signal at a first frame frequency and/or a second frame frequency to a display apparatus, the playback apparatus comprising:
a GUI generating unit operable to generate a graphical user interface that (i) provides to a user a warning that a disturbance may happen to a display on the display apparatus if a video signal of the first frame frequency and a video signal of the second frame frequency are continuously output in a non-continuation mode in which switching between frame frequencies may be caused during a playback, and (ii) urges the user to select either the non-continuation mode or a continuation mode in which switching between frame frequencies is not caused during a playback, and operable to display the graphical user interface on the display apparatus;
a mode setting unit operable to, after the graphical user interface is generated by the GUI generating unit, receive a selection by the user of the non-continuation mode or the continuation mode via the graphical user interface, and set an operation mode of the playback apparatus to the selected mode;
a sync control unit operable to, in a state where the mode setting unit has set the operation mode to the non-continuation mode, before switching a frame frequency of the video signal that is output during a playback, execute a synchronization process with the display apparatus in accordance with a frame frequency after the switching; and
a help control unit operable to cause the GUI generating unit to generate the graphical user interface when a help request is received from the user, if the playback apparatus is currently in the non-continuation mode and switching between frame frequencies has been caused during a playback, wherein
the first frame frequency is not an integral multiple of the second frame frequency.

11. A non-transitory computer-readable medium having a program stored therein for use in computer as a playback apparatus for obtaining a video signal from video information read out from a recording medium and outputting the obtained video signal to a display apparatus, the program causing the computer to perform the steps of:
reading supplementary information, which indicates whether a frame frequency of the video signal is a first frame frequency or a second frame frequency, from the recording medium and judging whether the video signal is of the first frame frequency or of the second frame frequency;
setting an operation mode of the playback apparatus to either a continuation mode in which there are no switching between frame frequencies during playback or a non-continuation mode in which switching between frame frequencies is allowed during playback, as selected by a user;
outputting the obtained video signal if the mode setting sets the operation mode to the continuation mode and if the video signal judging judges that the obtained video signal is of the first frame frequency, and generating a video signal of the first frame frequency by converting the obtained video signal and outputting the generated video signal if the mode setting sets the operation mode to the continuation mode and if the video signal judging judges that the obtained video signal is of the second frame frequency; and executing, in a state where the operation mode has been set to the non-continuation mode, before switching a frame frequency of the video signal that is output during a playback, a synchronization process with the display apparatus in accordance with a frame frequency after the switching, wherein the first frame frequency is not an integral multiple of the second frame frequency.

12. A playback method for use in a playback apparatus for obtaining a video signal from video information read out from a recording medium and outputting the obtained video signal to a display apparatus, the playback method comprising the steps of:

reading supplementary information, which indicates whether a frame frequency of the video signal is a first frame frequency or a second frame frequency, from the recording medium and judging whether the video signal is of the first frame frequency or of the second frame frequency;

setting an operation mode of the playback apparatus to either a continuation mode in which there are no switching between frame frequencies during playback or a non-continuation mode in which switching between frame frequencies is allowed during playback as selected by a user;

outputting the obtained video signal if the mode setting sets the operation mode to the continuation mode and if the video signal judging judges that the obtained video signal is of the first frame frequency, and generating a video signal of the first frame frequency by converting the obtained video signal and outputting the generated video signal if the mode setting sets the operation mode to the continuation mode and if the video signal judging judges that the obtained video signal is of the second frame frequency; and executing, in a state where the operation mode has been set to the non-continuation mode, before switching a frame frequency of the video signal that is output during a playback, a synchronization process with the display apparatus in accordance with a frame frequency after the switching, wherein the first frame frequency is not an integral multiple of the second frame frequency.

\* \* \* \* \*